United States Patent
Wang et al.

(10) Patent No.: US 9,244,593 B2
(45) Date of Patent: Jan. 26, 2016

(54) INFORMATION PROCESSING METHODS AND ELECTRONIC DEVICES

(71) Applicants: Beijing Lenovo Software LTD., Beijing (CN); Lenovo (Beijing) Limited, Beijing (CN)

(72) Inventors: Chao Wang, Beijing (CN); Jun Li, Beijing (CN); Yan Wang, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 175 days.

(21) Appl. No.: 14/229,115

(22) Filed: Mar. 28, 2014

(65) Prior Publication Data

US 2015/0121302 A1    Apr. 30, 2015

(30) Foreign Application Priority Data

| Oct. 28, 2013 | (CN) | 2013 1 0517720 |
| Oct. 28, 2013 | (CN) | 2013 1 0518247 |
| Oct. 28, 2013 | (CN) | 2013 1 0518300 |
| Feb. 10, 2014 | (CN) | 2014 1 0046892 |
| Feb. 21, 2014 | (CN) | 2014 1 0060618 |

(51) Int. Cl.
    *G06F 3/048* (2013.01)
    *G06F 3/0482* (2013.01)

(52) U.S. Cl.
    CPC .................. *G06F 3/0482* (2013.01)

(58) Field of Classification Search
    CPC .................................... G06F 3/0482
    USPC ........................................ 715/781, 800
    See application file for complete search history.

(56) References Cited

U.S. PATENT DOCUMENTS

| 8,959,453 | B1* | 2/2015 | Harnish | H04N 5/44504 |
| | | | | 715/719 |
| 8,970,630 | B2* | 3/2015 | Miyazaki | G06F 3/04883 |
| | | | | 345/173 |
| 2004/0189872 | A1* | 9/2004 | Amendolagine | H04N 9/74 |
| | | | | 348/578 |
| 2012/0084711 | A1* | 4/2012 | Duarte | G06F 3/0481 |
| | | | | 715/783 |
| 2013/0111398 | A1* | 5/2013 | Lu | G06F 3/0482 |
| | | | | 715/788 |
| 2014/0325431 | A1* | 10/2014 | Vranjes | G06F 3/0481 |
| | | | | 715/788 |

* cited by examiner

*Primary Examiner* — William Titcomb
(74) *Attorney, Agent, or Firm* — Westman, Champlin & Koehler, P.A.

(57) ABSTRACT

In an information processing method a first operation is received by a user; in response to the first operation, a first application is started and the first application is displayed in a windowlet of an electronic device; a second operation is received by the user in the windowlet; the second operation is parsed, an object corresponding to the second operation is determined, a second application corresponding to the object is determined, whether the second application meets a predetermined condition is judged to generate a judgment result, and the second application is started in a windowlet when the judgment result indicates that the second application meets the predetermined condition. In some embodiments, when a user starts and displays an application in a small window or windowlet, and the windowlet receives his or her operation to start a new application, the started new application will be also displayed in a windowlet.

22 Claims, 29 Drawing Sheets

INFORMATION PROCESSING METHODS AND ELECTRONIC DEVICES

TECHNICAL FIELD

The present disclosure relates to communication technology, and more particularly, to information processing methods and electronic devices.

BACKGROUND

Portable electronic devices having various functions are more and more popular with users and provide diversified user experiences. Such portable electronic device used in people's daily lives is generally designed to have a small screen so that it is easy to carry. Taking a mobile phone as example of the portable electronic device, the screen is usually designed to have a size of 3.5 inches so that the mobile phone is easy for users to carry around.

The inventors of the present application found at least the following problems with the related technology in the process of implementing solutions according to embodiments of the present application.

For the electronic device, such as mobile phone, the traditional information processing method is, when a plurality of applications are running in the mobile phone, the operating system allows only one of the applications to run in foreground, and only one application can be displayed in a single window. That is, the operating system (e.g., Android) of the mobile phone is just capable of providing a single-window function. As smart phones emerge, there is a trend that the screen of a mobile phone will become larger, and thus it is possible to support multi-window display. The term "window" here refers to a window in which an application running in the mobile phone is located. Details thereof will be omitted.

With the support for multi-window display, a user's demand may be, when he or she starts and displays an application in a small window or windowlet, and the windowlet receives the user's operation to start a new application, the started new application will be also displayed in a windowlet. There has not been any solution in the related art to meet the user's demand.

SUMMARY

The embodiments of the present disclosure provide information process methods and electronic devices to satisfy the above user's demand, i.e., when he or she starts and displays an application in a small window or windowlet, and the windowlet receives the user's operation to start a new application, the started new application will be also displayed in a windowlet.

An method of the present disclosure includes receiving a first operation by a user; in response to the first operation, starting a first application and displaying the first application in a windowlet; receiving a second operation by the user in the windowlet; parsing the second operation, determining an object corresponding to the second operation, determining a second application corresponding to the object, judging whether the second application meets a predetermined condition to generate a judgment result, and starting the second application in a windowlet when the judgment result indicates that the second application meets the predetermined condition.

The method of the present disclosure receives a second operation by the user in the windowlet, parses the second operation, determines an object corresponding to the second operation, determines a second application corresponding to the object, judge whether the second application meets a predetermined condition to generate a judgment result, and starts the second application in a windowlet when the judgment result indicates that the second application meets the predetermined condition. This satisfies the above user's demand, that is, when the user starts and displays an application in a small window or windowlet, and the windowlet receives his or her operation to start a new application, the started new application will be also displayed in a windowlet.

DETAILED DESCRIPTION OF THE EMBODIMENTS

The implementation of the solutions will be further described in detail below in conjunction with accompanying drawings.

Figure 1:
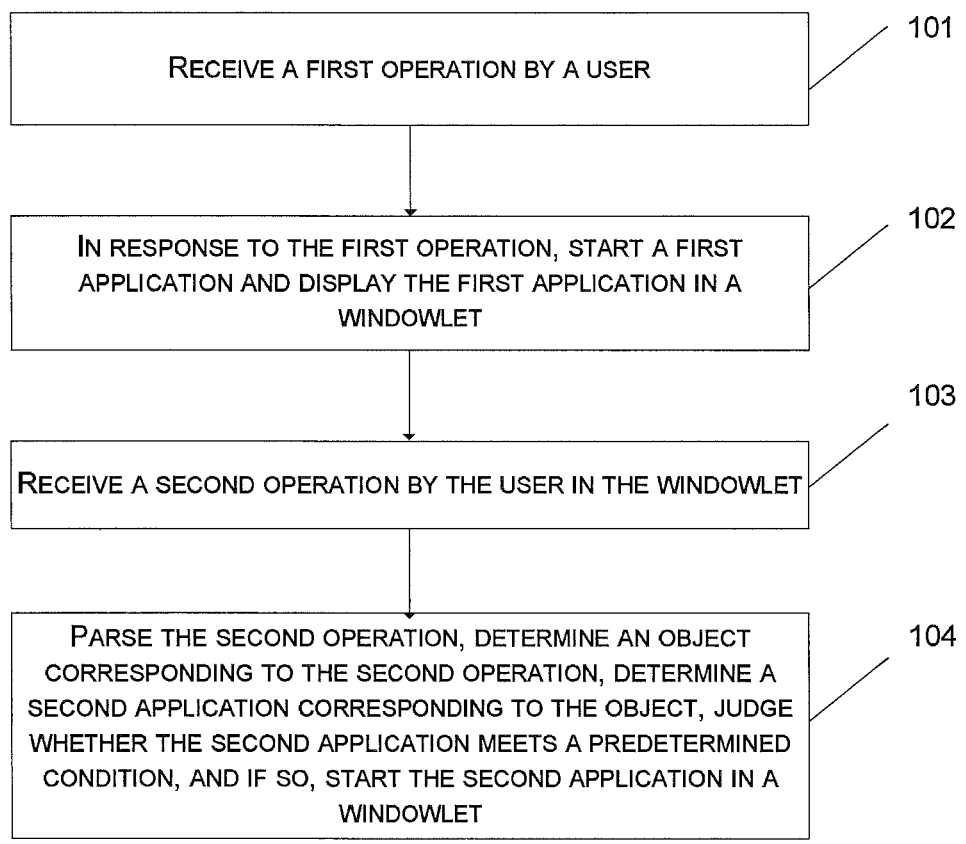
FIG. 1 is a schematic flowchart showing an implementation of a method embodiment of the present disclosure.

An information processing method according to an embodiment of the present disclosure is applied in an electronic device. The electronic device includes a touch-sensitive display unit including a display region. As shown in FIG. 1, the method includes:

Step 101: receiving a first operation by a user.

Step 102: in response to the first operation, starting a first application and displaying the first application in a windowlet.

Step 103: receiving a second operation by the user in the windowlet.

Step 104: parsing the second operation, determining an object corresponding to the second operation, determining a second application corresponding to the object, judging whether the second application meets a predetermined condition to generate a judgment result, and starting the second application in a windowlet when the judgment result indicates that the second application meets the predetermined condition.

The present embodiment can provide the following advantages.

For an electronic device, such as mobile phone, as smart phones emerge, there is a trend that the screen of the mobile phone will become larger, and thus it is possible to support multi-window display. The term "window" here refers to a window in which an application running in the mobile phone is located. Details thereof will be omitted Conventionally, when a plurality of applications are running in the mobile phone, one of the application currently being operated is presented in foreground, i.e., only one window for the application is in foreground on the screen of the mobile phone, while the other applications are in background, i.e., windows for the other applications are in background. If one of the windows in background is required, it is necessary to switch between the window and the window in the foreground. That is, in the conventional technology, although a plurality of applications are running at the same time, only one window is activated on the screen. The user can view only information of the application displayed in the window, leading to poor user experience and difficulties in user's operation. Further, frequent switching between windows in foreground and background occupies a lot of system resources. The present embodiment uses a windowlet to start the first application so that the first application is displayed in the form of a windowlet in the display area. That is, the present embodiment can support multi-window display, and thus support displaying a plurality of applications in a plurality of windows which are all in foreground. In this way, there is no need for switching between foreground and background, facilitating user operation and preventing frequent switching between windows in foreground and background from occupying a lot of system resources. Here, using a windowlet to start the first application may be also called starting the first application in a windowlet mode.

With steps 103 and 104 of the present embodiment, the user can choose to start a first application in a windowlet. Then, a second operation by the user is received in the windowlet. The second operation is parsed, an object corresponding to the second operation is determined, and a second application corresponding to the object is determined. Next, it is judged whether the second application meets a predetermined condition to generate a judgment result. When the judgment result indicates that the second application meets the predetermined condition, the second application is started in a windowlet. This satisfies the user's demand that a new application (second application) is also be displayed in a windowlet when a windowlet for displaying the first application receives the user's operation to start the new application. To put it simple, when an application (second application) linked to the first application is started by operating in a windowlet, the second application will be also started in a windowlet if it meets a predetermined condition.

Figure 2:
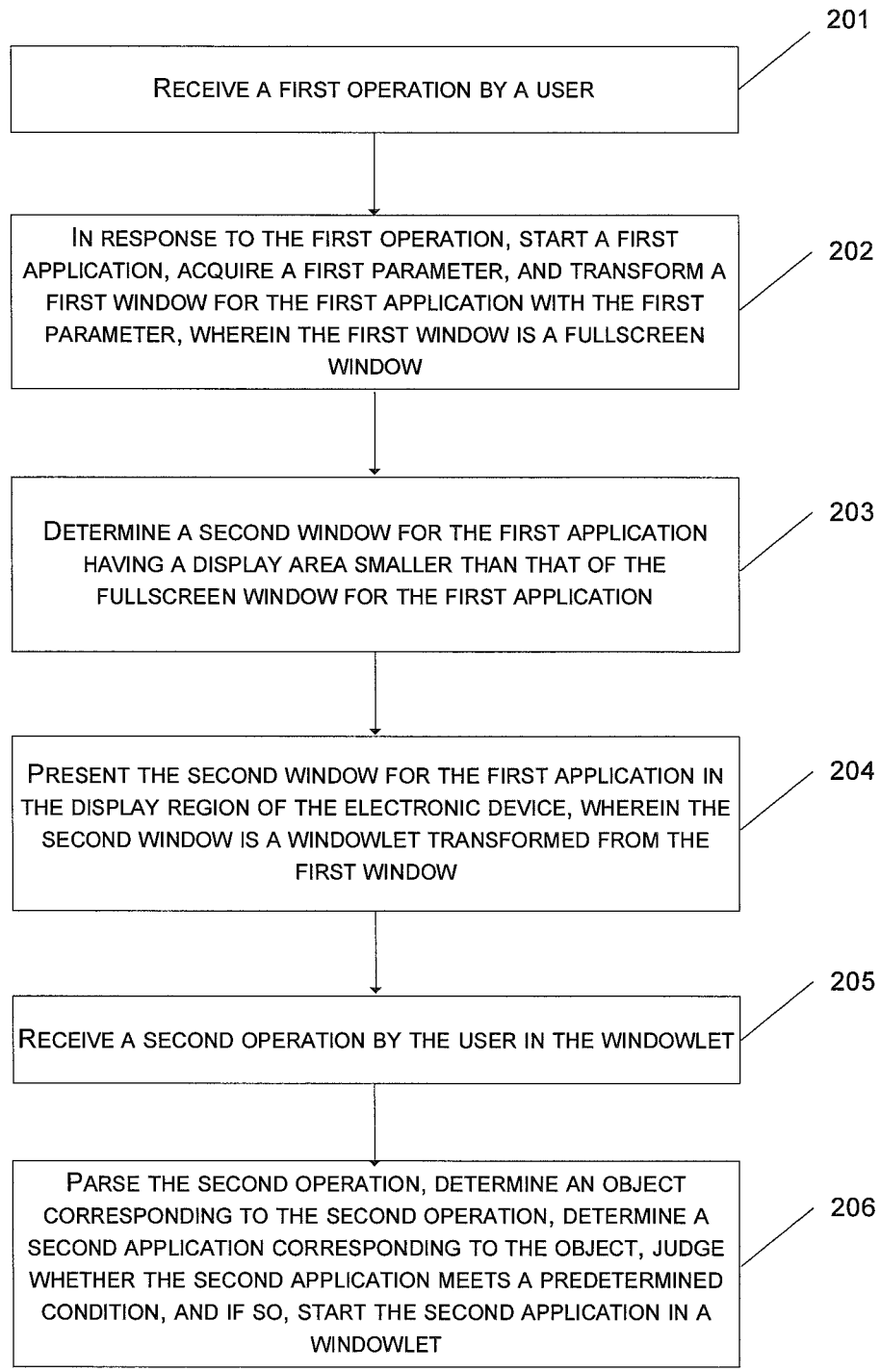
FIG. 2 is a schematic flowchart showing an implementation of a method embodiment of the present disclosure.

An information processing method according to an embodiment of the present disclosure is applied in an electronic device. The electronic device includes a touch-sensitive display unit including a display region. As shown in FIG. 2, the method includes:

Step 201: receiving a first operation by a user.

Step 202: in response to the first operation, starting a first application, acquiring a first parameter, and transforming a first window for the first application with the first parameter, wherein the first window is a fullscreen window.

Step 203: determining a second window for the first application having a display area smaller than that of the fullscreen window for the first application.

Step 204: presenting the second window for the first application in the display region of the electronic device, wherein the second window is a windowlet transformed from the first window.

Step 205: receiving a second operation by the user in the windowlet.

Step 206: parsing the second operation, determining an object corresponding to the second operation, determining a second application corresponding to the object, judging whether the second application meets a predetermined condition to generate a judgment result, and starting the second application in a windowlet when the judgment result indicates that the second application meets the predetermined condition.

The present embodiment can provide the following advantages.

For an electronic device, such as mobile phone, as smart phones emerge, there is a trend that the screen of the mobile phone will become larger, and thus it is possible to support multi-window display. The term "window" here refers to a window in which an application running in the mobile phone is located. Details thereof will be omitted Conventionally, when a plurality of applications are running in the mobile phone, one of the application currently being operated is presented in foreground, i.e., only one window for the application is in foreground on the screen of the mobile phone, while the other applications are in background, i.e., windows for the other applications are in background. If one of the windows in background is required, it is necessary to switch between the window and the window in the foreground. That is, in the conventional technology, although a plurality of applications are running at the same time, only one window is activated on the screen. The user can view only information of the application displayed in the window, leading to poor user experience and difficulties in user's operation. Further, frequent switching between windows in foreground and background occupies a lot of system resources. The present embodiment uses a windowlet to start the first application so that the first application is displayed in the form of a windowlet in the display area. That is, the present embodiment can support multi-window display, and thus support displaying a plurality of applications in a plurality of windows which are all in foreground. In this way, there is no need for switching between foreground and background, facilitating user operation and preventing frequent switching between windows in foreground and background from occupying a lot of system resources. Here, using a windowlet to start the first application may be also called starting the first application in a windowlet mode With steps 202-204, the present embodiment introduces the first parameter for starting the first application in a windowlet. The first parameter in the present embodiment is a transform parameter for transforming a window, and may be at least one of a parameter value, a matrix, a group of parameters, or a set of parameters.

The first parameter may be called a first transform matrix when it is in the form of a matrix. For the purpose of simplicity, the first transform matrix will be referred to as first matrix in the following embodiments.

To be noted, transforming the first window with the first parameter is intended to determine a second window to replace the first window so that the application is displayed in the second window. The second window is a windowlet (non-fullscreen window) having a display area smaller than that of the fullscreen window for the application. When the first parameter is in the form of a matrix, transform into a non-fullscreen window is possible, thereby better supporting multi-window display.

With steps 205 and 206 of the present embodiment, the user can choose to start a first application in a windowlet. Then, a second operation by the user is received in the windowlet. The second operation is parsed, an object corresponding to the second operation is determined, and a second application corresponding to the object is determined. Next, it is judged whether the second application meets a predetermined condition to generate a judgment result. When the judgment result indicates that the second application meets the predetermined condition, the second application is started in a windowlet. This satisfies the user's demand that a new application (second application) is also be displayed in a windowlet when a windowlet for displaying the first application receives the user's operation to start the new application. To put it simple, when an application (second application) linked to the first application is started by operating in a windowlet, the second application will be also started in a windowlet if it meets a predetermined condition. When a new window is opened through an application displayed in a windowlet, the system will automatically apply the above matrix transform of the windowlet to the new window.

In a preferred implementation, when the first parameter is in a matrix form, Steps 202-204 further include:

reading graphic buffer data of the application;

transforming the read graphic buffer data corresponding to the first window into graphic buffer data corresponding to the second window with the first matrix, and combining the graphic buffer data corresponding to the second window into frame butter data corresponding to the touch-sensitive display unit;

displaying the second window for the application on the touch-sensitive display unit using the frame buffer data, wherein the second window is used to replace the first window so that the application is displayed in the second window.

The above steps included in Steps 202-204 will be illustrated in an example of displaying two applications in the second windows, that is, displaying the two applications in a non-fullscreen mode.

A, reading graphic buffer data of first windows for the applications.

The two applications write drawing data for fullscreen display into graphic buffer. The graphic buffer data include two-dimensional coordinate information and three-color (RGB, Red Green Blue) information of individual pixels.

B, transforming, with the first matrix, the read graphic buffer data corresponding to the first windows into graphic buffer data corresponding to the second windows with the first matrix, and combining the graphic buffer data corresponding to the second window into frame butter data corresponding to the touch-sensitive display unit.

Figure 3:
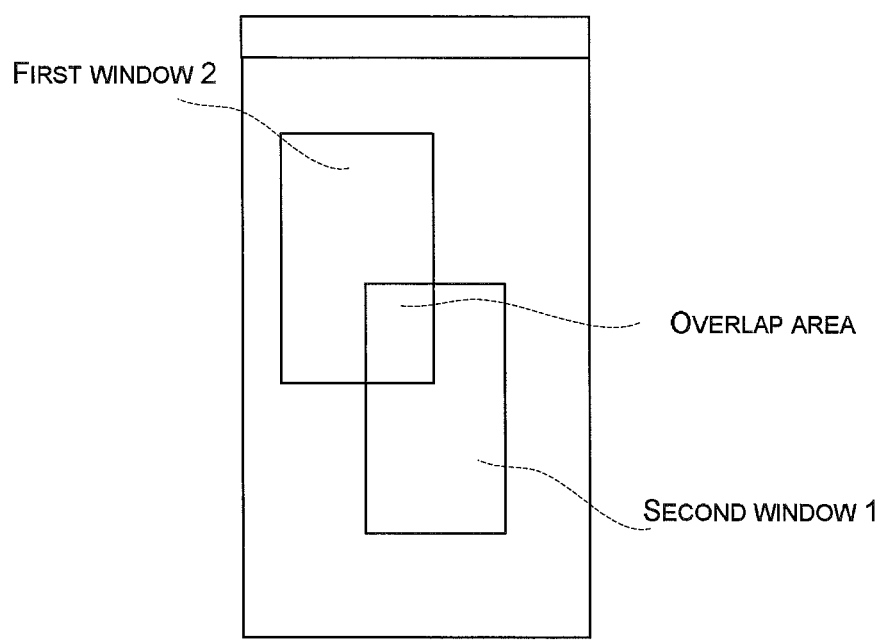
FIG. 3 is a schematic diagram showing a multi-window display in a method embodiment of the present disclosure.

In consideration that an overlapped area may exist between the second windows, for example, the second windows 1 and 2 have an overlap area as shown in FIG. 3. In the present embodiment, the two-dimensional coordinates $(x_o, y_o)$ identifying the pixels in the graphic buffer data of the first windows are extended into three-dimensional coordinates $(x_o, y_o, z_o)$, and accordingly different second windows have different third dimensional coordinates $z_o$. Therefore, the different second windows can be distinguished by different third dimensional coordinates, and it is possible to determine an overlapping relationship between display areas of different second windows when they have an overlap area with each other. For example, when there is an overlapped area between the second windows 1 and 2, if the third dimensional coordinate of the second window 2 is farther from the origin of coordinates than the that of the second window 1, it indicates that a part of the display area of the second window 1 is overlapped with the second window 2, and the overlap area between the second windows 1 and 2 is used by the second window 2 for display.

The graphic buffer data read in step A are combined with graphic buffer data corresponding to common display applications (for example, status bar) of the electronic device into frame buffer data, i.e., obtaining content for fullscreen display of the electronic device. In the present embodiment, by transforming the extended three-dimensional coordinates $(x_o, y_o, z_o)$ in the graphic buffer data with the first matrix, the first window (fullscreen window) for the application will be transformed into the second window (windowlet). The transformed graphic buffer data include the transformed $(x_o, y_o, z_o)$, and RGB information of the respective pixels.

In an example of transforming the first window into the second window by ½ reduction in equal proportion, the first matrix is $$\begin{pmatrix} 1/2 & 0 & 0 \\ 0 & 1/2 & 0 \\ 0 & 0 & 1/2 \end{pmatrix},$$

and the three-dimensional coordinates $(x_t, y_t, z_t)$ of the respective pixels in the frame butter data corresponding to the second window is denoted in Equation (1):

$$(x_t, y_t, z_t) = \begin{pmatrix} 1/2 & 0 & 0 \\ 0 & 1/2 & 0 \\ 0 & 0 & 1/2 \end{pmatrix} \times \begin{pmatrix} x_o \\ y_o \\ z_o \end{pmatrix} \quad (1)$$

In an example of transforming the first window into the second window by ½ reduction in equal proportion, and shifting the second window by Δx in a horizontal direction and by Δy in a longitudinal direction, the first matrix is $$\begin{pmatrix} 1/2 & 0 & \Delta x \\ 0 & 1/2 & \Delta y \\ 0 & 0 & 1/2 \end{pmatrix},$$

and the three-dimensional coordinates $(x_t, y_t, z_t)$ of the respective pixels in the frame butter data corresponding to the second window is denoted in Equation (2):

$$(x_t, y_t, z_t) = \begin{pmatrix} 1/2 & 0 & \Delta x \\ 0 & 1/2 & \Delta y \\ 0 & 0 & 1/2 \end{pmatrix} \times \begin{pmatrix} x_o \\ y_o \\ z_o \end{pmatrix} \quad (2)$$

In an example of transforming the first window into the second window by ½ reduction in equal proportion, and rotating the second window clockwise by an angle θ, the first matrix is $$\begin{pmatrix} \cos\theta/2 & 0 & 0 \\ 0 & \cos\theta/2 & 0 \\ 0 & 0 & \cos\theta/2 \end{pmatrix},$$

and the three-dimensional coordinates $(x_t, y_t, z_t)$ of the respective pixels in the frame butter data corresponding to the second window is denoted in Equation (3):

$$(x_t, y_t, z_t) = \begin{pmatrix} \cos\theta/2 & 0 & 0 \\ 0 & \cos\theta/2 & 0 \\ 0 & 0 & \cos\theta/2 \end{pmatrix} \times \begin{pmatrix} x_o \\ y_o \\ z_o \end{pmatrix} \quad (3)$$

In practical implementations, the initial position of the second window in the touch-sensitive display unit may be preset when the first window is transformed into the second window for the first time. Alternatively, information of an area of the touch-sensitive display unit specified by a user can be obtained through interaction with the user, and the specified area may be used as the display area of the second window. When a touch operation for scaling, moving or rotating the second window is received after the second window is displayed, the touch operation is parsed to obtain a parameter for scaling, moving or rotating, and step C is executed.

C, displaying the second window for the application on the touch-sensitive display unit using the frame buffer data, the second window for replacing the first window so that the application is displayed in the second window.

In the following method embodiments which support multi-window display and in which the window includes at least a windowlet, and the first parameter is in a matrix form, the above description of obtaining a windowlet through matrix transform will be involved, that is, transforming the first window into the second window with the first matrix to replace the first window so that the application is displayed in the second window. Details thereof will be omitted hereafter.

Figure 4:
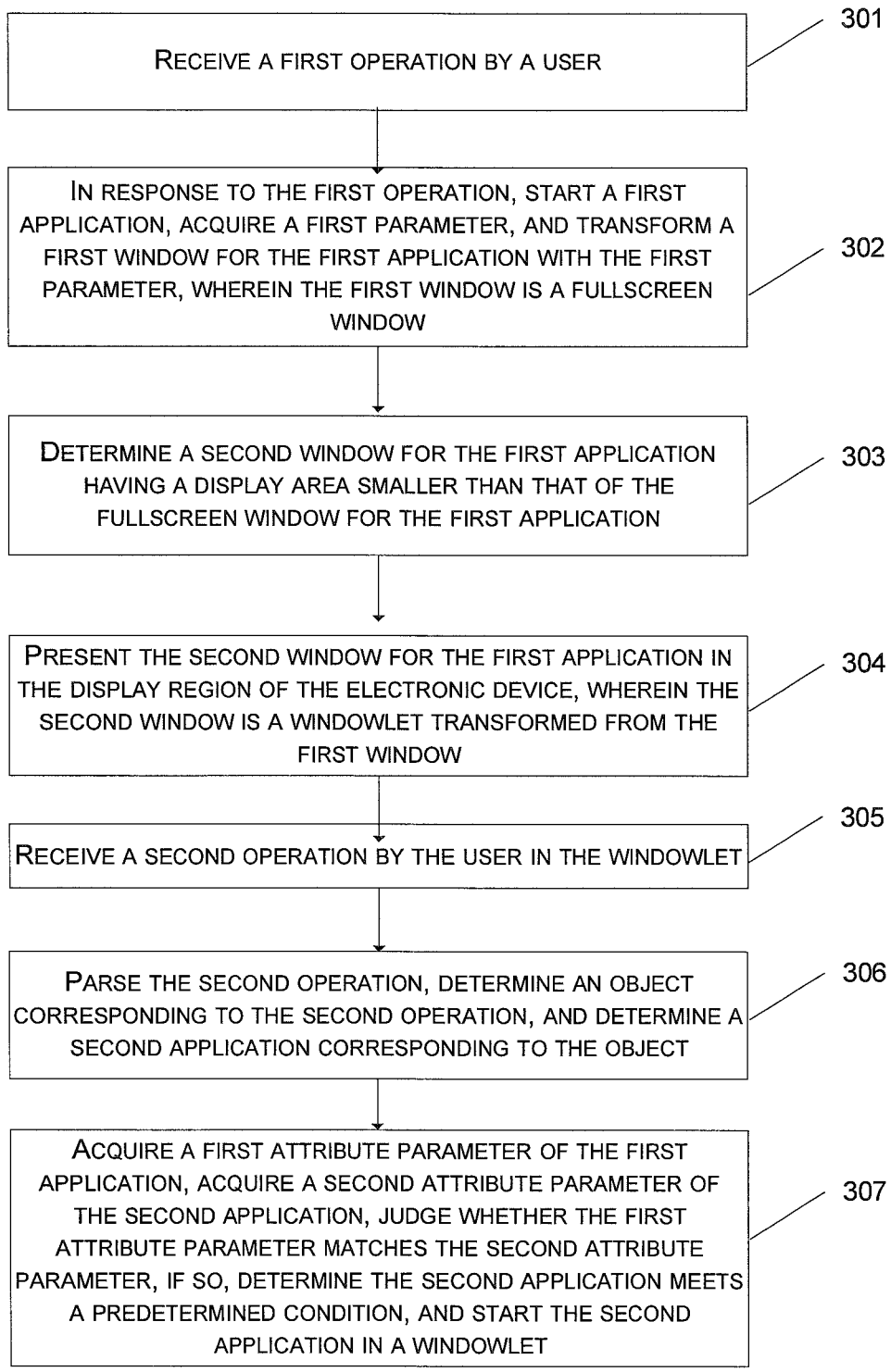
FIG. 4 is a schematic flowchart showing an implementation of a method embodiment of the present disclosure.

An information processing method according to an embodiment of the present disclosure is applied in an electronic device. The electronic device includes a touch-sensitive display unit including a display region. As shown in FIG. 4, the method includes:

Step 301: receiving a first operation by a user.

Step 302: in response to the first operation, starting a first application, acquiring a first parameter, and transforming a first window for the first application with the first parameter, wherein the first window is a fullscreen window.

Step 303: determining a second window for the first application having a display area smaller than that of the fullscreen window for the first application.

Step 304: presenting the second window for the first application in the display region of the electronic device, wherein the second window is a windowlet transformed from the first window.

Step 305: receiving a second operation by the user in the windowlet.

Step 306: parsing the second operation, determining an object corresponding to the second operation, and determining a second application corresponding to the object.

Step 307: acquiring a first attribute parameter of the first application, acquiring a second attribute parameter of the second application, judging whether the first attribute parameter matches the second attribute parameter, if so, determining the second application meets a predetermined condition, and starting the second application in a windowlet.

The present embodiment can provide the following advantages.

For an electronic device, such as mobile phone, as smart phones emerge, there is a trend that the screen of the mobile phone will become larger, and thus it is possible to support multi-window display. The term "window" here refers to a window in which an application running in the mobile phone is located. Details thereof will be omitted Conventionally, when a plurality of applications are running in the mobile phone, one of the application currently being operated is presented in foreground, i.e., only one window for the application is in foreground on the screen of the mobile phone, while the other applications are in background, i.e., windows for the other applications are in background. If one of the windows in background is required, it is necessary to switch between the window and the window in the foreground. That is, in the conventional technology, although a plurality of applications are running at the same time, only one window is activated on the screen. The user can view only information of the application displayed in the window, leading to poor user experience and difficulties in user's operation. Further, frequent switching between windows in foreground and background occupies a lot of system resources. The present embodiment uses a windowlet to start the first application so that the first application is displayed in the form of a windowlet in the display area. That is, the present embodiment can support multi-window display, and thus support displaying a plurality of applications in a plurality of windows which are all in foreground. In this way, there is no need for switching between foreground and background, facilitating user operation and preventing frequent switching between windows in foreground and background from occupying a lot of system resources. Here, using a windowlet to start the first application may be also called starting the first application in a windowlet mode With steps 302-304, the present embodiment introduces the first parameter for starting the first application in a windowlet. The first parameter in the present embodiment is a transform parameter for transforming a window, and may be at least one of a parameter value, a matrix, a group of parameters, or a set of parameters.

The first parameter may be called a first transform matrix when it is in the form of a matrix. For the purpose of simplicity, the first transform matrix will be referred to as first matrix in the following embodiments.

To be noted, transforming the first window with the first parameter is intended to determine a second window to replace the first window so that the application is displayed in the second window. The second window is a windowlet (or non-fullscreen window) having a display area smaller than that of the fullscreen window for the application. When the first parameter is in the form of a matrix, transform into a non-fullscreen window is possible, thereby better supporting multi-window display.

With steps 305-307 of the present embodiment, the user can choose to start a first application in a windowlet. Then, a second operation by the user is received in the windowlet. The second operation is parsed, an object corresponding to the second operation is determined, and a second application corresponding to the object is determined. Next, it is judged whether the second application meets a predetermined condition to generate a judgment result. When the judgment result indicates that the second application meets the predetermined condition, the second application is started in a windowlet. This satisfies the user's demand that a new application (second application) is also be displayed in a windowlet when a windowlet for displaying the first application receives the user's operation to start the new application. For example, if there is a hyperlink in the window for the first application, the second application may be started by clicking the hyperlink. The first application is displayed in a windowlet, and the started second application is also displayed in a windowlet.

To put it simple, when an application (second application) linked to the first application is started by operating in a windowlet, the second application will be also started in a windowlet if it meets a predetermined condition. When a new window is opened through an application displayed in a windowlet, the system will automatically apply the above matrix transform of the windowlet to the new window.

In a preferred implementation, the windowlets for displaying the first and second applications have the same or different sizes.

In a preferred implementation, the windowlets for displaying the first and second applications may be arranged at staggered positions so that there is no block between the windowlets.

Figure 5:
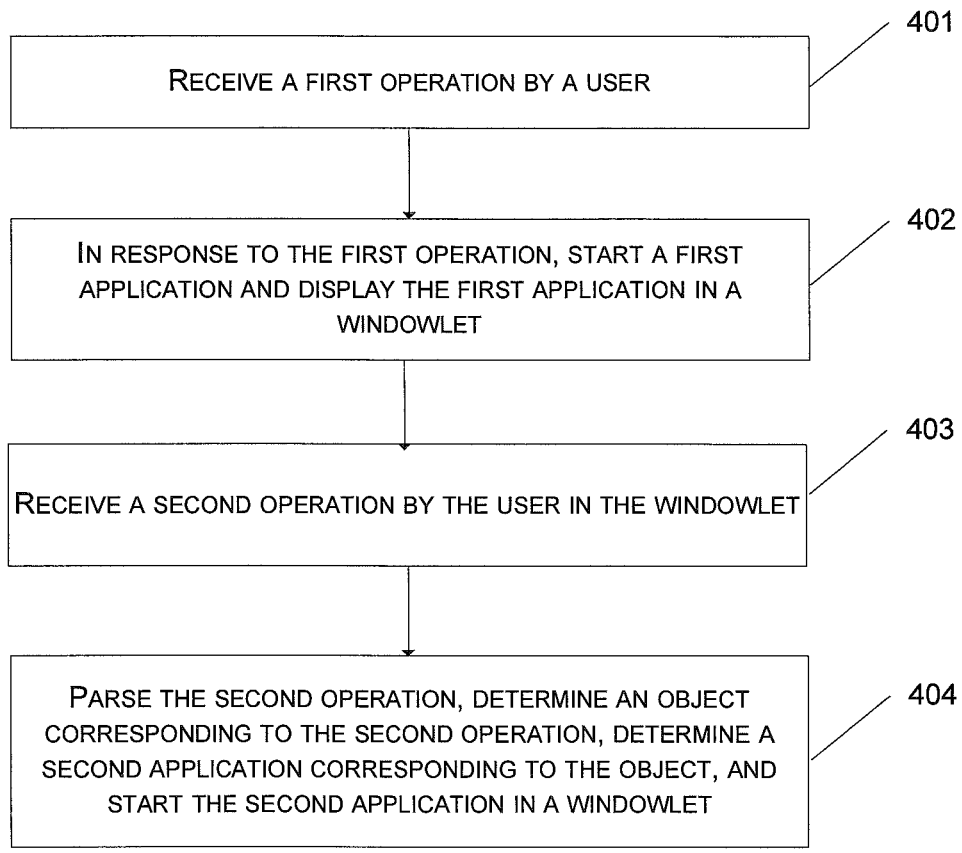
FIG. 5 is a schematic flowchart showing an implementation of a method embodiment of the present disclosure.

An information processing method according to an embodiment of the present disclosure is applied in an electronic device. The electronic device includes a touch-sensitive display unit including a display region. As shown in FIG. 5, the method includes:

Step 401: receiving a first operation by a user.

Step 402: in response to the first operation, starting a first application and displaying the first application in a windowlet.

Step 403: receiving a second operation by the user in the windowlet.

Step 404: parsing the second operation, determining an object corresponding to the second operation, determining a second application corresponding to the object, and starting the second application in a windowlet.

The present embodiment can provide the following advantages.

For an electronic device, such as mobile phone, as smart phones emerge, there is a trend that the screen of the mobile phone will become larger, and thus it is possible to support multi-window display. The term "window" here refers to a window in which an application running in the mobile phone is located. Details thereof will be omitted Conventionally, when a plurality of applications are running in the mobile phone, one of the application currently being operated is presented in foreground, i.e., only one window for the application is in foreground on the screen of the mobile phone, while the other applications are in background, i.e., windows for the other applications are in background. If one of the windows in background is required, it is necessary to switch between the window and the window in the foreground. That is, in the conventional technology, although a plurality of applications are running at the same time, only one window is activated on the screen. The user can view only information of the application displayed in the window, leading to poor user experience and difficulties in user's operation. Further, frequent switching between windows in foreground and background occupies a lot of system resources. The present embodiment uses a windowlet to start the first application so that the first application is displayed in the form of a windowlet in the display area. That is, the present embodiment can support multi-window display, and thus support displaying a plurality of applications in a plurality of windows which are all in foreground. In this way, there is no need for switching between foreground and background, facilitating user operation and preventing frequent switching between windows in foreground and background from occupying a lot of system resources. Here, using a windowlet to start the first application may be also called starting the first application in a windowlet mode.

With steps 403 and 404 of the present embodiment, the user can choose to start a first application in a windowlet. Then, a second operation by the user is received in the windowlet. The second operation is parsed, an object corresponding to the second operation is determined, and a second application corresponding to the object is determined. Next, it is judged whether the second application meets a predetermined condition to generate a judgment result. When the judgment result indicates that the second application meets the predetermined condition, the second application is started in a windowlet. This satisfies the user's demand that a new application (second application) is also be displayed in a windowlet when a windowlet for displaying the first application receives the user's operation to start the new application. To put it simple, when an application (second application) linked to the first application is started by operating in a windowlet, the second application will be also started in a windowlet if it meets a predetermined condition In a preferred implementation, the step pf in response to the first operation, starting a first application and displaying the first application in a windowlet may further includes: in response to the first operation, starting a first application, acquiring a first parameter, and transforming a first window for the first application with the first parameter, wherein the first window is a fullscreen window; determining a second window for the first application having a display area smaller than that of the fullscreen window for the first application; presenting the second window for the first application in the display region of the electronic device, wherein the second window is a windowlet transformed from the first window When the first parameter is in a matrix form in the present embodiment, the above description of obtaining a windowlet through matrix transform will be involved, that is, transforming the first window into the second window with the first matrix to replace the first window so that the application is displayed in the second window. Details thereof will be omitted here.

Examples of the embodiments in specific scenarios (including a scenario requiring a judgment process and a scenario requiring no judgment process) are described.

I. A Scenario Requiring a Judgment Process

The user first activates a web browser in the electronic device. The web browser is displayed in a windowlet which is denoted as window 1 for easy illustration. There is a video link address in the window 1, and a video player may be activated if the user clicks the address. With the video link address, windows displaying the web browser and the video player are in a relationship of window concatenation. Then, it is judged that the video player is also displayed in a windowlet denoted as window 2. In this way, when the video player is activated in the window 1 (windowlet) displaying the web browser, the video player will be displayed in the window 2 which is also a windowlet.

II. A Scenario Requiring No Judgment Process

As long as an application activated by the user is displayed in a windowlet, any other application activated from the windowlet will also be displayed in another windowlet. For example, the user activates an application QQ, which is displayed in a windowlet. There is a notification of a list of applications pushed from a server on a message bar of QQ. If the user started any of the applications, the application will be displayed in a windowlet.

The effect achieved in any of the above scenarios is that any application will also be displayed in a windowlet if the application is activated from another windowlet.

Description of electronic devices below is similar to that of the above methods. The beneficial effects are the same as those of the methods, and thus description thereof will be omitted. Details of the electronic device embodiments of the present disclosure can be learned with reference to the description of the method embodiments of the present disclosure.

Figure 6:
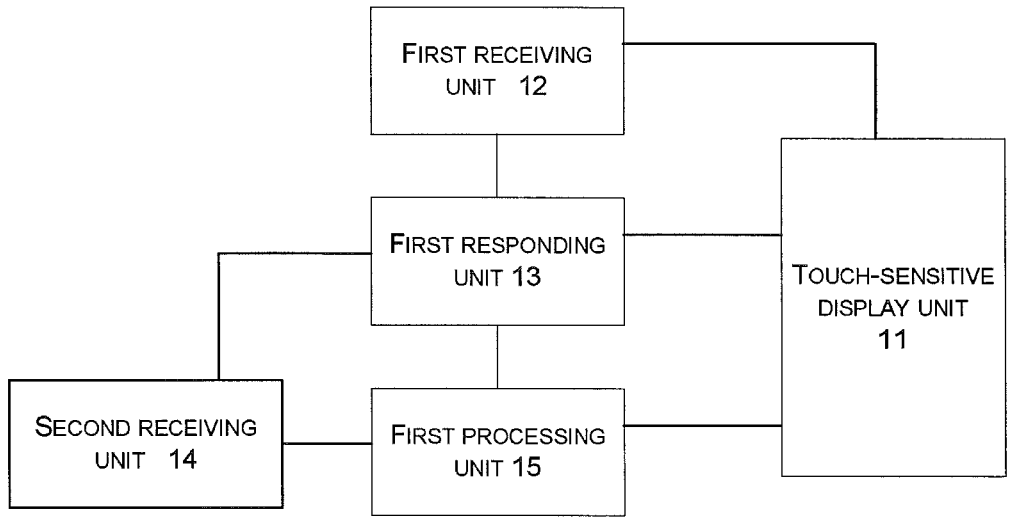
FIG. 6 is a schematic block diagram of an electronic device embodiment of the present disclosure.

An electronic device according to an embodiment of the present disclosure includes a touch-sensitive display unit 11 including a display region as shown in FIG. 6, the electronic device further includes:

a first receiving unit 12 configured to receive a first operation by a user;

a first responding unit 13 configured to in response to the first operation, start a first application and display the first application in a windowlet;

a second receiving unit 14 configured to receive a second operation by the user in the windowlet;

a first processing unit 15 configured to parse the second operation, determine an object corresponding to the second operation, determine a second application corresponding to the object, judge whether the second application meets a predetermined condition to generate a judgment result, and start the second application in a windowlet when the judgment result indicates that the second application meets the predetermined condition.

An electronic device according to an embodiment of the present disclosure includes a touch-sensitive display unit 11 including a display region as shown in FIG. 6. The electronic device further includes:

a first receiving unit 12 configured to receive a first operation by a user;

a first responding unit 13 configured to in response to the first operation, start a first application, acquire a first parameter, and transform a first window for the first application with the first parameter, wherein the first window is a fullscreen window; determine a second window for the first application having a display area smaller than that of the fullscreen window for the first application; present the second window for the first application in the display region of the electronic device, wherein the second window is a windowlet transformed from the first window.

a second receiving unit 14 configured to receive a second operation by the user in the windowlet;

a first processing unit 15 configured to parse the second operation, determine an object corresponding to the second operation, determine a second application corresponding to the object, judge whether the second application meets a predetermined condition to generate a judgment result, and starte the second application in a windowlet when the judgment result indicates that the second application meets the predetermined condition.

To be noted, the first parameter in the present embodiment is a transform parameter for transforming a window, and may be at least one of a parameter value, a matrix, a group of parameters, or a set of parameters.

When the first parameter is in the form of a matrix, the above description of transforming into a windowlet through a matrix in the method embodiments may be involved. Details thereof will be omitted here.

An electronic device according to an embodiment of the present disclosure includes a touch-sensitive display unit 11 including a display region as shown in FIG. 6. The electronic device further includes:

a first receiving unit 12 configured to receive a first operation by a user;

a first responding unit 13 configured to in response to the first operation, start a first application, acquire a first parameter, and transform a first window for the first application with the first parameter, wherein the first window is a fullscreen window; determine a second window for the first application having a display area smaller than that of the fullscreen window for the first application; present the second window for the first application in the display region of the electronic device, wherein the second window is a windowlet transformed from the first window.

a second receiving unit 14 configured to receive a second operation by the user in the windowlet;

a first processing unit 15 configured to parse the second operation, determine an object corresponding to the second operation, determine a second application corresponding to the object, acquire a first attribute parameter of the first application, acquire a second attribute parameter of the second application, judge whether the first attribute parameter matches the second attribute parameter, if so, determine the second application meets a predetermined condition, and start the second application in a windowlet.

To be noted, the first parameter in the present embodiment is a transform parameter for transforming a window, and may be at least one of a parameter value, a matrix, a group of parameters, or a set of parameters.

When the first parameter is in the form of a matrix, the above description of transforming into a windowlet through a matrix in the method embodiments may be involved. Details thereof will be omitted here.

An electronic device according to an embodiment of the present disclosure includes a touch-sensitive display unit 11 including a display region as shown in FIG. 6, the electronic device further includes:

a first receiving unit 12 configured to receive a first operation by a user;

a first responding unit 13 configured to in response to the first operation, start a first application and display the first application in a windowlet;

a second receiving unit 14 configured to receive a second operation by the user in the windowlet;

a first processing unit 15 configured to parse the second operation, determine an object corresponding to the second operation, determine a second application corresponding to the object, and start the second application in a windowlet.

The present embodiment has a constitution similar to that of the above electronic device embodiments, but has a different function in the first processing unit 15. Specifically, the first processing unit 15 of the above electronic device embodiments implements a judgment process of judging whether the second application meets a predetermined condition to generate a judgment result, and starting the second application in a windowlet if the judgment result indicates that the second application meets the predetermined condition. The present embodiment does not require such judgment process. Instead, the present embodiment receives a second operation by the user in the windowlet, parses the second operation, determine an object corresponding to the second operation, determine a second application corresponding to the object, and start the second application in a windowlet. This satisfies the user's demand that a new application (second application) is also be displayed in a windowlet when a windowlet for displaying the first application receives the user's operation to start the new application. To put it simple, when an application (second application) linked to the first application is started by operating in a windowlet, the second application will be also started in a windowlet if it meets a predetermined condition In a preferred implementation, the first responding unit 13 is configured to in response to the first operation, start a first application, acquire a first parameter, and transform a first window for the first application with the first parameter, wherein the first window is a fullscreen window; determine a second window for the first application having a display area smaller than that of the fullscreen window for the first application; present the second window for the first application in the display region of the electronic device, wherein the second window is a windowlet transformed from the first window To be noted, the first parameter in the present embodiment is a transform parameter for transforming a window, and may be at least one of a parameter value, a matrix, a group of parameters, or a set of parameters.

When the first parameter is in the form of a matrix, the above description of transforming into a windowlet through a matrix in the method embodiments may be involved. Details thereof will be omitted here.

According to an embodiment of the present disclosure, an electronic device and an information processing method are provided. The electronic device is able to execute a first application which may be displayed in a windowlet or fullscreen window on a display screen of the electronic device. The size of the windowlet is smaller than that of the full screen window for the first application. The windowlet is transformed from the fullscreen window using a first transform parameter.

A first operation is detected, and a first instruction for adjusting a window for displaying the first application is generated based on the first operation.

The first window is acquired to display the first application, and state information of the first window is recorded.

A second operation for activating the first application is detected, and the state information of the first window is acquired.

The first application is displayed based on the state information of the first window.

In the embodiment of the present disclosure, the first application installed in the electronic device may be an application built in the electronic device system, for example, a clock application, a calculator application, a camera application, and an address book application, or may be a third-party application installed by a user, for example, a game application, a WeChat application, a browser application, an instant chat application, a mail application etc.

In general, all of the installed first applications can be displayed in a form of an interactive object on the desktop of the electronic device and corresponds to one interactive object. The interactive object may be an object logo, which is generally an icon. A first application corresponding to an object logo of the first application may be started by operating the object logo. For example, on the desktop of the electronic device such as a mobile phone, when a user touches an icon of the address book application, the address book application may be started, to enable the address book recorded in the address book application to be displayed on the display screen of the electronic device. When the first application is started through the desktop, the first application will be displayed in a form of fullscreen window on the display screen of the electronic device.

In the embodiment of the present disclosure, the first transform parameter may be pre-stored in a database of the electronic device, and may be at least one of a parameter value, a matrix, a group of parameters or a set of parameters. For example, in practical applications, the first transform parameter may be represented in a form of matrix, or in a form of a group of parameters. Each of the parameters in the group may be a numerical value, or a vector. In the following, the first transform parameter will be represented in a form of a matrix, and thus defined as a first matrix in the embodiment of the present disclosure. The first matrix may be pre-stored in a matrix function library of the electronic device. The fullscreen window of the first application may be transformed into a windowlet using the first matrix. For example, transforms such as scale-down, translation and shape transform may be applied to the fullscreen window to convert the fullscreen window into a windowlet.

Graphical buffer data of the first application in the fullscreen window may be transformed into graphical buffer data of the first application in the windowlet using the first matrix. With the transform of the graphical buffer data in the fullscreen window, a display effect can be achieved that the fullscreen window of the first application is scaled down to a windowlet, and thus the first application is displayed in the windowlet on the display screen of the electronic device. Meanwhile, the first matrix may also be used to perform, for example, a translation transform, a shape transform, or an angle transform on the windowlet.

Preferably, the first matrix may be preset by a manufacturer of the electronic device, or may be set manually by a user on the electronic device. In order to facilitate the user in setting the first matrix manually, the electronic device provides a function of automatically generating a matrix. The user may simply set certain parameters related to the first matrix, for example, a window horizontal coordinate scale parameter, a window longitudinal coordinate scale parameter, a window translation parameter, a window shape parameter, and a window angle rotation parameter, and then the electronic device may generate a corresponding first matrix based on these parameters.

Here, scale and rotation transforms may be performed on the fullscreen window of the first application using the first matrix through Equation (4):

$$\begin{pmatrix} x_2 \\ y_2 \\ z_2 \end{pmatrix} = \begin{pmatrix} M_{11} & M_{12} & M_{13} \\ M_{21} & M_{22} & M_{23} \\ M_{31} & M_{32} & M_{33} \end{pmatrix} \times \begin{pmatrix} x_1 \\ y_1 \\ z_1 \end{pmatrix} \quad (4)$$

In Equation (4), $$\begin{pmatrix} x_2 \\ y_2 \\ z_2 \end{pmatrix}$$

is a coordinate vector of a windowlet, where $x_2$ is a horizontal coordinate of the windowlet, $y_2$ is a longitudinal coordinate of the windowlet, $z_2$ is generally set to 1 by default;

$$V = \begin{pmatrix} M_{11} & M_{12} & M_{13} \\ M_{21} & M_{22} & M_{23} \\ M_{31} & M_{32} & M_{33} \end{pmatrix},$$

where V represents the first matrix of a 3×3 size, $M_{ij}$ represents an element at the $i^{th}$ row and the $j^{th}$ column of the first matrix, a value of i is 1, 2 or 3, and a value of j is 1, 2 or 3; and $$\begin{pmatrix} x_1 \\ y_1 \\ z_1 \end{pmatrix}$$

represents a coordinate vector of a fullscreen window, where $x_1$ is a horizontal coordinate of the fullscreen window, $y_1$ is a longitudinal coordinate of the fullscreen window, and $z_1$ is generally set to 1 by default.

When the scale transform is performed on the fullscreen window using Equation (4), 4 elements in $M_{ij}$ may be set as $M_{11}=\alpha, M_{12}=0, M_{21}=0, M_{22}=\beta$, and the other 5 elements may be set randomly. Then, Equation (5) may be derived by substituting the parameters set above into Equation (4):

$$x_2=\alpha \times x_1$$

$$y_2=\beta \times y_1 \quad (5)$$

where $\alpha$ is a horizontal coordinate scale parameter, and $\beta$ is a longitudinal coordinate scale parameter.

When a clockwise rotation transform is performed on the fullscreen window using Equation (4), 4 elements in $M_{ij}$ may be set as $M_{11}=\cos\theta, M_{12}=\sin\theta, M_{21}=-\sin\theta, M_{22}=\cos\theta$, and the other 5 elements may be set randomly. Then, Equation (6) may be derived by substituting the parameters set above into Equation (4):

$$x_2=\cos\theta \times x_1 + \sin\theta \times y_1$$

$$y_2=-\sin\theta \times x_1 + \cos\theta \times y_1 \quad (6)$$

where $\theta$ is a rotation angle.

A translation transform may be performed on the fullscreen window of the first application using the first matrix through Equation (7):

$$\begin{pmatrix} x_2 \\ y_2 \\ z_2 \end{pmatrix} = \begin{pmatrix} M_{11} \\ M_{21} \\ M_{31} \end{pmatrix} + \begin{pmatrix} x_1 \\ y_1 \\ z_1 \end{pmatrix} \quad (7)$$

When the translation transform is performed on the fullscreen window using Equation (7), 3 elements in $M_{ij}$ may be set as $M_{11}=a, M_{21}=b, M_{31}=0$. Then, Equation (8) may be derived by substituting the parameters set above into Equation (7):

$$x_2=a+x_1$$

$$y_2=b+Y_1 \quad (5a)$$

where a is a horizontal coordinate translation parameter, and b is a longitudinal coordinate translation parameter.

In the above schemes, there may be multiple coordinate vectors of the fullscreen window, and each coordinate vector corresponds to a position of one pixel. Similarly, there may be multiple coordinate vectors of the windowlet, and the number of the coordinate vectors of the windowlet corresponds to that of the fullscreen window. Each coordinate vector of the windowlet also corresponds to a position of one pixel which is a corresponding pixel of the fullscreen window.

In practical implementations, the respective elements in the first matrix may be set as some other values, so that the fullscreen window can be transformed into a desired windowlet. Further, if required, the respective elements in the first matrix may be set in such a manner that scale, translation and rotation operations can be performed simultaneously on the fullscreen window.

In the embodiment of the present disclosure, the first matrix V may be another square matrix, for example, a 4×4 square matrix. Those skilled in the art can change the dimension of the square matrix according to practical requirements, and detailed description will be omitted here.

For a full understanding of the features and solutions of the present disclosure, the implementation of the solutions will be further described in detail below in conjunction with accompanying drawings, which are merely for reference instead of limiting the present disclosure.

Figure 7:
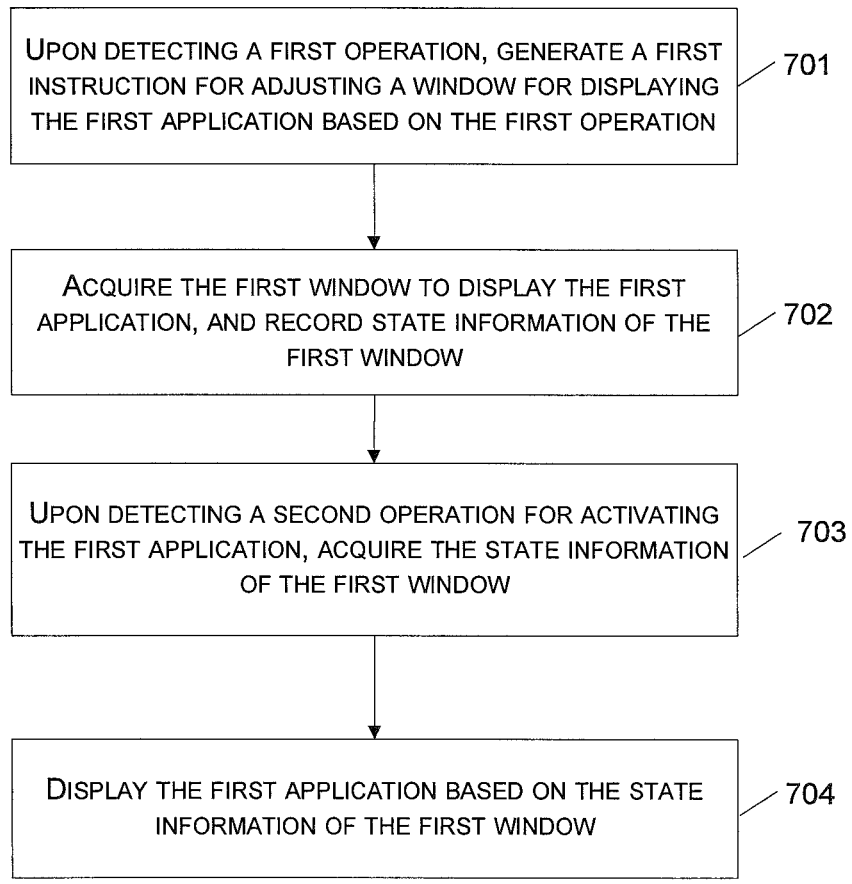
FIG. 7 is a schematic flowchart of an information processing method according to an embodiment of the present disclosure.

FIG. 7 is a schematic flowchart of an information processing method according to an embodiment of the present disclosure. The information processing method may be applied in an electronic device which is able to execute a first application. The first application may be displayed in a windowlet or fullscreen window on a display screen of the electronic device. The size of the windowlet is smaller than that of the full screen window for the first application. The windowlet is transformed from the fullscreen window using a first transform parameter. In an preferred embodiment, the information processing method primarily includes the following steps.

Step 701: upon detecting a first operation, generating a first instruction for adjusting a window for displaying the first application based on the first operation.

Specifically, the first operation is a user's operation on the size and/or display area of the window for displaying the first application while he or she uses the first application. The first operation may include at least one of changing the display area of the window, scaling down the window, or scaling up the window. For example, the first operation may be performing a scale-down transform, a scale-up transform, a translation transform and a shape transform on the current window for the first application.

The first application installed in the electronic device may be an application built in the electronic device system, for example, a clock application, or a camera application, or may be a third-party application installed by a user, for example, a game application, or a WeChat application.

In the present embodiment, the first application is an application supporting a windowlet display. The first application will be displayed in a windowlet on the display screen of the electronic device when the first application is activated in, but not limited to, any of the following manners.

The first application may be activated by: adding the first application in to a multi-window management interface so that the first application can support a windowlet display, where the multi-window management interface may be displayed by activating an icon corresponding to a multi-window management application; and displaying the first application in a windowlet on the display screen of the electronic device upon activating the first application through the multi-window management interface.

Step 702: acquiring the first window to display the first application, and recording state information of the first window.

Preferably, the state information of the first window includes information indicating that the first application is displayed in a fullscreen window or a windowlet. When the state information includes the information indicates that the first application is displayed in a windowlet, the state information further includes at least one of size, display area or frame aspect ratio of the window.

In the present embodiment, the acquiring of the first window may primarily include: generating a first transform parameter based on the first instruction; and transforming the current window with the first transform parameter to generate the first window for displaying the first application.

Here, the process of transforming the current window with the first transform parameter to generate the first window for displaying the first application may be implemented with reference to the foregoing Equations (4)~(8). Details thereof will be omitted here.

Step 703: upon detecting a second operation for activating the first application, acquiring the state information of the first window.

Generally, the system will active an application in the same approach as that previously used to active the application. Alternatively, after activating an application in certain approach, if the size of a window for displaying the application is adjusted while the application is being used, a window will be opened with the adjusted size when the application is activated next time.

In the present embodiment, the state information of the first window may be acquired upon detecting the second operation, and then the first application is displayed based on the state information of the first window.

Step 704: displaying the first application based on the state information of the first window.

In the present embodiment, the state information of the first window is recorded when the current first window for the first application is subjected to scale-down, scale-up, translation or shape transform. The first application is displayed based on the state information of the first window when an operation for activating the first application is detected again. In this way, the first application will be displayed according to the user's habit of using the first application, thereby improving the user experience.

Figure 8:
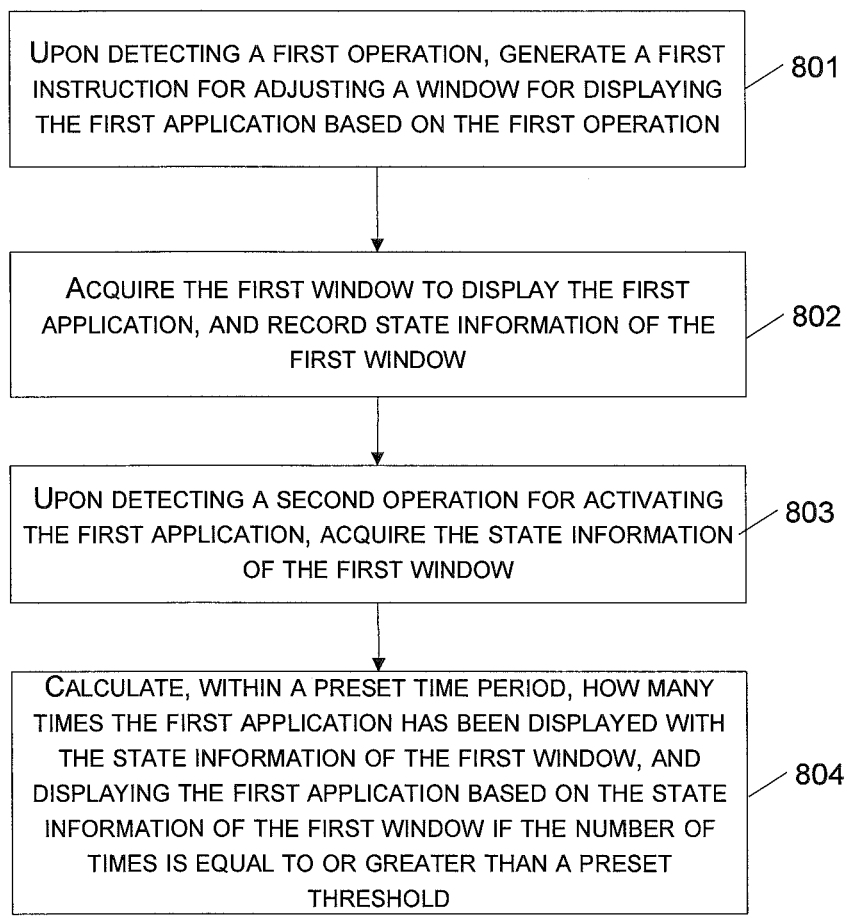
FIG. 8 is a schematic flowchart of an information processing method according to an embodiment of the present disclosure.

FIG. 8 is a schematic flowchart of an information processing method according to an embodiment of the present disclosure. The information processing method may be applied in an electronic device which is able to execute a first application. The first application may be displayed in a windowlet or fullscreen window on a display screen of the electronic device. The size of the windowlet is smaller than that of the full screen window for the first application. The windowlet is transformed from the fullscreen window using a first transform parameter. In an preferred embodiment, the information processing method primarily includes the following steps.

Step 801: upon detecting a first operation, generating a first instruction for adjusting a window for displaying the first application based on the first operation.

Specifically, the first operation is a user's operation on the size and/or display area of the window for displaying the first application while he or she uses the first application. The first operation may include at least one of changing the display area of the window, scaling down the window, or scaling up the window. For example, the first operation may be performing a scale-down transform, a scale-up transform, a translation transform and a shape transform on the current window for the first application.

The first application installed in the electronic device may be an application built in the electronic device system, for example, a clock application, or a camera application, or may be a third-party application installed by a user, for example, a game application, or a WeChat application.

In the present embodiment, the first application is an application supporting a windowlet display. The first application will be displayed in a windowlet on the display screen of the electronic device when the first application is activated in, but not limited to, any of the following manners.

The first application may be activated by: adding the first application in to a multi-window management interface so that the first application can support a windowlet display, where the multi-window management interface may be displayed by activating an icon corresponding to a multi-window management application; and displaying the first application in a windowlet on the display screen of the electronic device upon activating the first application through the multi-window management interface.

Step 802: acquiring the first window to display the first application, and recording state information of the first window.

Preferably, the state information of the first window includes information indicating that the first application is displayed in a fullscreen window or a windowlet. When the state information includes the information indicates that the first application is displayed in a windowlet, the state information further includes at least one of size, display area or frame aspect ratio of the window.

In the present embodiment, the acquiring of the first window may primarily include: generating a first transform parameter based on the first instruction; and transforming the current window with the first transform parameter to generate the first window for displaying the first application.

Here, the process of transforming the current window with the first transform parameter to generate the first window for displaying the first application may be implemented with reference to the foregoing Equations (4)~(8). Details thereof will be omitted here.

Step 803: upon detecting a second operation for activating the first application, acquiring the state information of the first window.

Generally, the system will active an application in the same approach as that previously used to active the application. Alternatively, after activating an application in certain approach, if the size of a window for displaying the application is adjusted while the application is being used, a window will be opened with the adjusted size when the application is activated next time.

In the present embodiment, the state information of the first window may be acquired upon detecting the second operation, and then the first application is displayed based on the state information of the first window as specifically described in step 804.

Step 804: calculating, within a preset time period, how many times the first application has been displayed with the state information of the first window, and displaying the first application based on the state information of the first window if the number of times is equal to or greater than a preset threshold.

Preferably, the method further includes displaying the first application in a default display form of the electronic device, if the number of times is less then the preset threshold.

The preset time period may be a day, a week, a month, etc., and may be default in the system of the electronic device or set by the user.

The method is applied in the electronic device, and thus steps 801-804 may be executed by the electronic device.

The present embodiment calculate, within a preset time period, how many times the first application has been displayed with the state information of the first window, and displays the first application based on the state information of the first window if the number of times is equal to or greater than a preset threshold. In this way, it is possible to determine intelligently which window form should be taken to display the first application when it is activated again. This improves the user experience.

Figure 9:
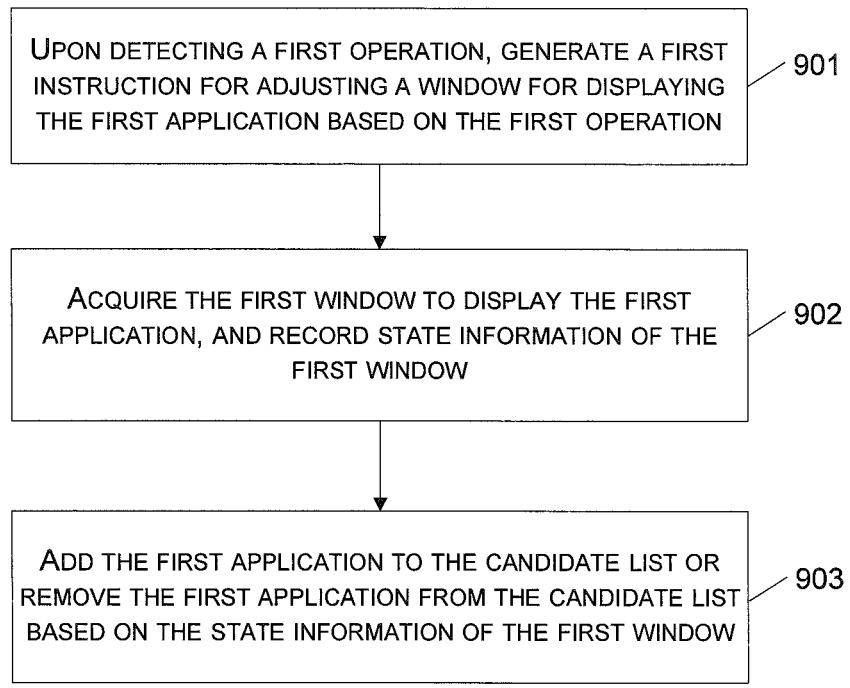
FIG. 9 is a schematic flowchart of an information processing method according to an embodiment of the present disclosure.

FIG. 9 is a schematic flowchart of an information processing method according to an embodiment of the present disclosure. The information processing method may be applied in an electronic device which is able to execute a first application. The first application may be displayed in a windowlet or fullscreen window on a display screen of the electronic device. The size of the windowlet is smaller than that of the full screen window for the first application. The windowlet is transformed from the fullscreen window using a first transform parameter. Further, a candidate list is provided in the electron device for storing the first application that supports a windowlet display. In a preferred embodiment, the information processing method primarily includes the following steps.

Step 901: upon detecting a first operation, generating a first instruction for adjusting a window for displaying the first application based on the first operation.

Specifically, the first operation is a user's operation on the size and/or display area of the window for displaying the first application while he or she uses the first application. The first operation may include at least one of changing the display area of the window, scaling down the window, or scaling up the window. For example, the first operation may be performing a scale-down transform, ascale-up transform, a translation transform and a shape transform on the current window for the first application.

The first application installed in the electronic device may be an application built in the electronic device system, for example, a clock application, or a camera application, or may be a third-party application installed by a user, for example, a game application, or a WeChat application.

In the present embodiment, the first application is an application supporting a windowlet display. The first application will be displayed in a windowlet on the display screen of the electronic device when the first application is activated in, but not limited to, any of the following manners.

The first application may be activated by: adding the first application in to a multi-window management interface so that the first application can support a windowlet display, where the multi-window management interface may be displayed by activating an icon corresponding to a multi-window management application; and displaying the first application in a windowlet on the display screen of the electronic device upon activating the first application through the multi-window management interface.

Step 902: acquiring the first window to display the first application, and recording state information of the first window.

Preferably, the state information of the first window includes information indicating that the first application is displayed in a fullscreen window or a windowlet. When the state information includes the information indicates that the first application is displayed in a windowlet, the state information further includes at least one of size, display area or frame aspect ratio of the window.

In the present embodiment, the acquiring of the first window may primarily include: generating a first transform parameter based on the first instruction; and transforming the current window with the first transform parameter to generate the first window for displaying the first application.

Here, the process of transforming the current window with the first transform parameter to generate the first window for displaying the first application may be implemented with reference to the foregoing Equations (4)~(8). Details thereof will be omitted here.

Step 903: adding the first application to the candidate list or removing the first application from the candidate list based on the state information of the first window.

Preferably, the step of adding the first application to the candidate list or removing the first application from the candidate list based on the state information of the first window includes: when the first application exists in the candidate list, removing the first application from the candidate list, if the first application has been activated in a windowlet mode from the candidate list for a number of times less than a first threshold, and/or if the first application has been activated in a windowlet mode from the candidate list, and the window for displaying the first application is adjusted so that the first application has been presented in a fullscreen mode for a number of times equal to or larger than a second threshold; when the first application does not exist in the candidate list, adding the first application to the candidate list, if the first application has been activated in a fullscreen mode, and the window for displaying the first application is adjusted so that the first application has been presented in a windowlet mode for a number of times equal to or larger than a third threshold.

Preferably, the method further includes providing a notification information to the user when adding the first application to the candidate list or removing the first application from the candidate list; and adding the first application to the candidate list or removing the first application from the candidate list upon receiving a confirm instruction from the user or upon receiving no refusal instruction from the user within a preset time period.

Here, the notification information may be in a form of voice, or dialogue box.

Preferably, the method further includes upon detecting a second operation for activating the first application, acquiring the state information of the first window; and displaying the first application based on the state information of the first window.

The step of displaying the first application based on the state information of the first window may include calculating, within a preset time period, how many times the first application has been displayed with the state information of the first window, and displaying the first application based on the state information of the first window if the number of times is equal to or greater than a preset threshold.

In the above embodiment, upon detecting an adjustment operation on the window for displaying the first application while the user uses the application, the state information of the adjusted first window is recorded. The first application is added to or removed from the candidate list based on the state information of the first window. In this way, it is possible to intelligently maintain the candidate list according to the user's habit of using the application, thereby improving the user experience.

Figure 10:
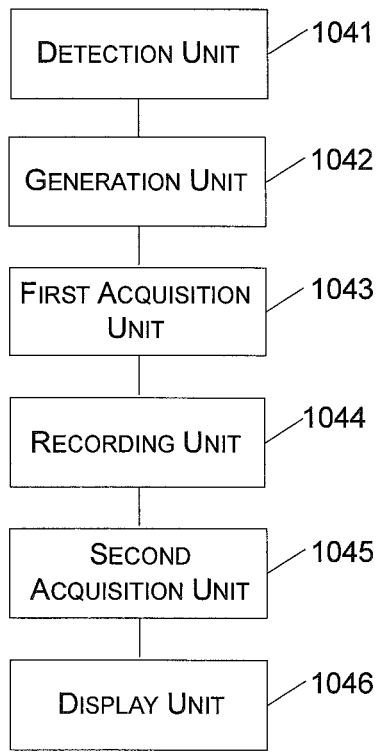
FIG. 10 is a schematic block diagram of an electronic device according to an embodiment of the present disclosure.

FIG. 10 is a schematic block diagram of an electronic device according to an embodiment of the present disclosure. The electronic device is able to execute a first application, which may be displayed in a windowlet or fullscreen window on a display screen of the electronic device. The size of the windowlet is smaller than that of the full screen window for the first application. The windowlet is transformed from the fullscreen window using a first transform parameter. The electronic device includes a detection unit 1041, a generation unit 1042, a first acquisition unit 1043, a recording unit 1044, a second acquisition unit 1045, and a display unit 1046.

The detection unit 1041 is configured to detect a first operation, and further to detect a second operation for activating the first application.

The generation unit 1042 is configured to generate a first instruction for adjusting a window for displaying the first application based on the first operation.

The first acquisition unit 1043 is configured to acquire a first window.

The recording unit 1044 is configured to record state information of the first window.

The second acquisition unit 1043 is configured to acquire the state information of the first window when the detection unit detects the second operation.

The display unit 1046 is configured to display the first application in the first window, and further to display the first application based on the state information of the first window.

Preferably, the first operation is a user's operation on the size and/or display area of the window for displaying the first application while he or she uses the first application. The first operation may include at least one of changing the display area of the window, scaling down the window, or scaling up the window.

The state information of the first window includes information indicating that the first application is displayed in a fullscreen window or a windowlet. When the state information includes the information indicates that the first application is displayed in a windowlet, the state information further includes at least one of size, display area or frame aspect ratio of the window.

Preferably, the first transform parameter may be at least one of a parameter value, a matrix, a group of parameters, or a set of parameters.

Those skilled in the art will appreciate that the functions of the respective units in the electronic device as shown in FIG. 10 can be learned with reference to the foregoing description of the information processing methods.

Figure 11:
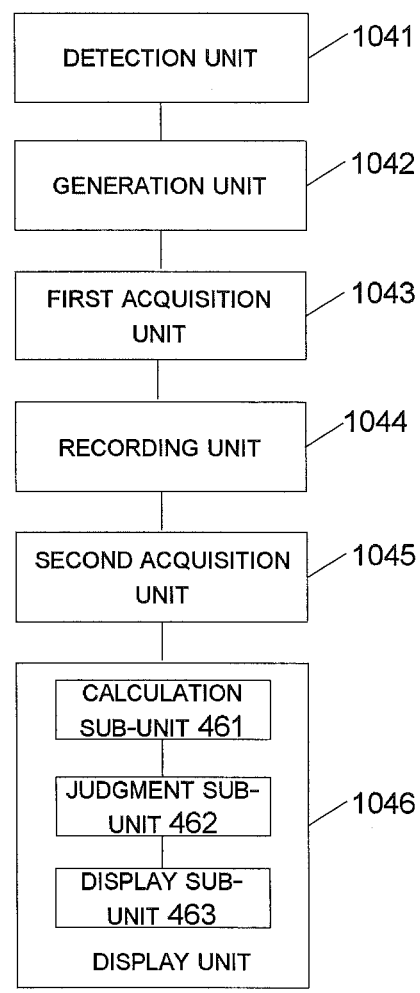
FIG. 11 is a schematic block diagram of an electronic device according to an embodiment of the present disclosure.

An embodiment of the present disclosure provides an electronic device as shown in FIG. 11. The electronic device also includes a detection unit 1041, a generation unit 1042, a first acquisition unit 1043, a recording unit 1044, a second acquisition unit 1045, and a display unit 1046.

The detection unit 1041 is configured to detect a first operation, and further to detect a second operation for activating the first application.

The generation unit 1042 is configured to generate a first instruction for adjusting a window for displaying the first application based on the first operation.

The first acquisition unit 1043 is configured to acquire a first window.

The recording unit 1044 is configured to record state information of the first window.

The second acquisition unit 1043 is configured to acquire the state information of the first window when the detection unit detects the second operation.

The display unit 1046 is configured to display the first application in the first window, and further to display the first application based on the state information of the first window.

Preferably, the first operation is a user's operation on the size and/or display area of the window for displaying the first application while he or she uses the first application. The first operation may include at least one of changing the display area of the window, scaling down the window, or scaling up the window.

The state information of the first window includes information indicating that the first application is displayed in a fullscreen window or a windowlet. When the state information includes the information indicates that the first application is displayed in a windowlet, the state information further includes at least one of size, display area or frame aspect ratio of the window.

Preferably, the first transform parameter may be at least one of a parameter value, a matrix, a group of parameters, or a set of parameters.

Preferably, the display unit 1046 is further configured to calculate, within a preset time period, how many times the first application has been displayed with the state information of the first window, and display the first application based on the state information of the first window if the number of times is equal to or greater than a preset threshold.

Specifically, the display unit 1046 further includes a calculation sub-unit 461, a judgment sub-unit 462, and a display sub-unit 463.

The calculation sub-unit 461 is configured to calculate, within a preset time period, how many times the first application has been displayed with the state information of the first window.

The judgment sub-unit 462 is configured to judge if the number of times is equal to or greater than a preset threshold.

The display sub-unit 463 is configured to display the first application based on the state information of the first window if the number of times is equal to or greater than a preset threshold.

The display sub-unit 463 is further configured to display the first application in a default display form of the electronic device, if the number of times is less then the preset threshold.

The preset time period may be a day, a week, a month, etc., and may be default in the system of the electronic device or set by the user.

Those skilled in the art will appreciate that the functions of the respective units in the electronic device as shown in FIG. 11 can be learned with reference to the foregoing description of the information processing methods.

Figure 12:
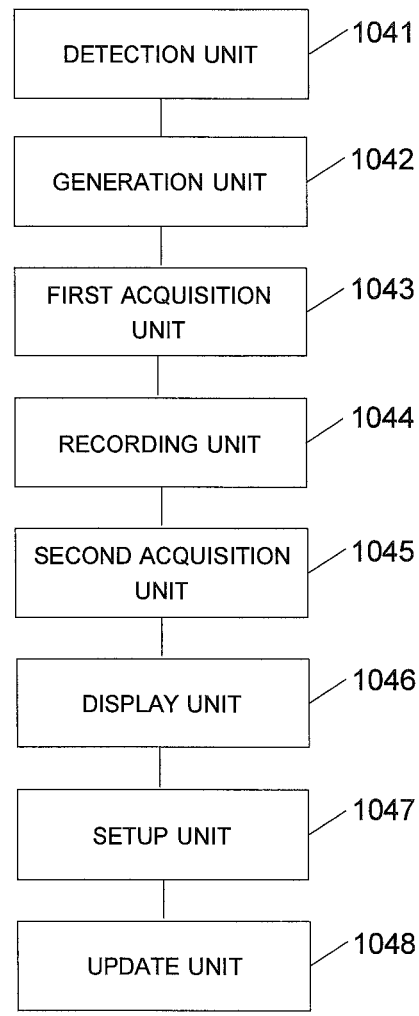
FIG. 12 is a schematic block diagram of an electronic device according to an embodiment of the present disclosure.

An embodiment of the present disclosure provides an electronic device as shown in FIG. 12. The electronic device also includes a detection unit 1041, a generation unit 1042, a first acquisition unit 1043, a recording unit 1044, a second acquisition unit 1045, a display unit 1046, a setup unit 1047, and an update unit 1048.

The detection unit 1041 is configured to detect a first operation, and further to detect a second operation for activating the first application.

The generation unit 1042 is configured to generate a first instruction for adjusting a window for displaying the first application based on the first operation.

The first acquisition unit 1043 is configured to acquire a first window.

The recording unit 1044 is configured to record state information of the first window.

The second acquisition unit 1043 is configured to acquire the state information of the first window when the detection unit detects the second operation.

The display unit 1046 is configured to display the first application in the first window, and further to display the first application based on the state information of the first window.

The setup unit 1047 is configured to set a candidate list for storing the first application that can be displayed in a windowlet.

The update unit 1048 is configured to add the first application to the candidate list or remove the first application from the candidate list based on the state information of the first window.

Preferably, the update unit 1048 is specifically configured to: when the first application exists in the candidate list, remove the first application from the candidate list, if the first application has been activated in a windowlet mode from the candidate list for a number of times less than a first threshold, and/or if the first application has been activated in a windowlet mode from the candidate list, and the window for displaying the first application is adjusted so that the first application has been presented in a fullscreen mode for a number of times equal to or larger than a second threshold; when the first application does not exist in the candidate list, add the first application to the candidate list, if the first application has been activated in a fullscreen mode, and the window for displaying the first application is adjusted so that the first application has been presented in a windowlet mode for a number of times equal to or larger than a third threshold.

Those skilled in the art will appreciate that the functions of the respective units in the electronic device as shown in FIG. 12 can be learned with reference to the foregoing description of the information processing methods.

An embodiment of the present disclosure provides an information processing method and an electronic device that includes a touch-sensitive display unit and is able to execute an application. The information processing method includes: acquiring a first event for presenting the application in a windowlet within a display region of the display unit, wherein the size of the windowlet is smaller than that of a fullscreen window; acquiring a first transform parameter based on the first event; transforming the fullscreen window for the application with the first transform parameter to generate a windowlet for the application so that the application is in a windowlet state.

In the embodiment of the present disclosure, the application installed in the electronic device may be an application built in the electronic device system, for example, a clock application, a calculator application, a camera application, and an address book application, or may be a third-party application installed by a user, for example, a game application, a WeChat application, a browser application, an instant chat application, a mail application etc.

In general, all the installed applications can be displayed in a form of an interactive object on the desktop of the electronic device and corresponds to one interactive object. The interactive object may be an object logo, which is generally an icon. A first application corresponding to an object logo of the first application may be started by operating the object logo. For example, on the desktop of the electronic device such as a mobile phone, when a user touches an icon of the address book application, the address book application may be started, to enable the address book recorded in the address book application to be displayed on the display screen of the electronic device. When the first application is started through the desktop, the first application will be displayed in a form of fullscreen window on the display screen of the electronic device.

In the embodiment of the present disclosure, the first event is used to present the application in a windowlet within a display region of the display unit, and the size of the windowlet is smaller than that of a fullscreen window.

In the embodiment of the present disclosure, the first transform parameter may be pre-stored in a database of the electronic device, and may be at least one of a parameter value, a matrix, a group of parameters or a set of parameters. For example, in practical applications, the first transform parameter may be represented in a form of matrix, or in a form of a group of parameters. Each of the parameters in the group may be a numerical value, or a vector. In the following, the first transform parameter will be represented in a form of a matrix, and thus defined as a first matrix in the embodiment of the present disclosure. The first matrix may be pre-stored in a matrix function library of the electronic device. The fullscreen window of the application may be transformed into a windowlet using the first matrix. For example, transforms such as scale-down, translation and shape transform may be applied to the fullscreen window to convert the fullscreen window into a windowlet.

Graphical buffer data of the application in the fullscreen window may be transformed into graphical buffer data of the application in the windowlet using the first matrix. With the transform of the graphical buffer data in the fullscreen window, a display effect can be achieved that the fullscreen window of the application is scaled down to a windowlet, and thus the application is displayed in a windowlet state on the touch-sensitive display unit. Meanwhile, the first matrix may also be used to perform, for example, a translation transform, a shape transform, or an angle transform on the windowlet.

Preferably, the first matrix may be preset by a manufacturer of the electronic device, or may be set manually by a user on the electronic device. In order to facilitate the user in setting the first matrix manually, the electronic device provides a function of automatically generating a matrix. The user may simply set certain parameters related to the first matrix, for example, a window horizontal coordinate scale parameter, a window longitudinal coordinate scale parameter, a window translation parameter, a window shape parameter, and a window angle rotation parameter, and then the electronic device may generate a corresponding first matrix based on these parameters.

Figure 13:
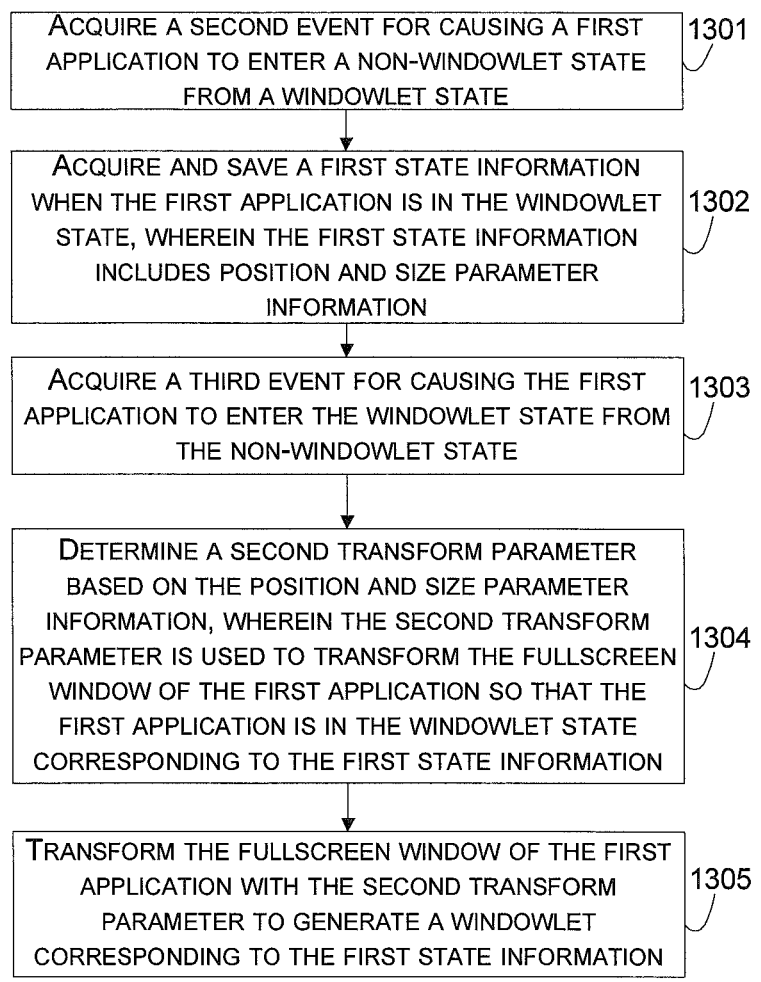
FIG. 13 is a schematic flowchart of an information processing method according to an embodiment of the present disclosure.

An embodiment of the present disclosure provides an information processing method in an electronic device that includes a touch-sensitive display unit and is able to execute an application. The information processing method includes acquiring a first event for presenting the application in a windowlet within a display region of the display unit, wherein the size of the windowlet is smaller than that of a fullscreen window; acquiring a first transform parameter based on the first event; transforming the fullscreen window for the application with the first transform parameter to generate a windowlet for the application so that the application is in a windowlet state. FIG. 13 is a schematic flowchart of the information processing method according to the present embodiment. As shown in FIG. 13, the method includes:

Step 1301: acquiring a second event for causing a first application to enter a non-windowlet state from a windowlet state.

Here, the non-windowlet state may include a fullscreen window state, a background state, a turnoff state, or a Killed state. The Killed state refers to a state where the user causes the first application to exit from the task manager by using a Kill command. Generally, the first application remains in the task manager after it is turned off, so that the first application can be quickly activated next time.

The second event may occur in the following scenarios. For example, when the user has installed a one-key-clearup application, and the user activates the application, an application will be killed. Therefore, activation of the one-key-clearup application will cause the first application in the windowlet state to enter the Killed state. As another example, if an application has bug, the application will collapse during its execution, and cause the first application in the windowlet state to enter the turnoff state. As still another example, when the memory of the electronic device is insufficient, the operating system will automatically kill some applications, and thus cause the applications in the windowlet state to enter the Killed state. In practical implementations, the second event is triggered as long as the second event can cause the first application to enter a non-windowlet state from a windowlet state. Details thereof will be omitted here.

Step 1302: acquiring and saving a first state information when the first application is in the windowlet state, wherein the first state information includes position parameter information and size parameter information.

Step 1303: acquiring a third event for causing the first application to enter the windowlet state from the non-windowlet state.

Here, the third event is similar to the second event. In practical implementations, the third event is triggered as long as it can cause the first application to enter a windowlet state from a non-windowlet state. Details thereof will be omitted here.

Step 1304: determining a second transform parameter based on the position parameter information and size parameter information in the saved first state information, wherein the second transform parameter is used to transform the fullscreen window of the first application so that the first application is in the windowlet state corresponding to the first state information.

Here, the second transform parameter is similar to the first transform parameter, and details thereof will be omitted here.

Step 1305: transforming the fullscreen window of the first application with the second transform parameter to generate a windowlet corresponding to the first state information.

The present embodiment acquires a second event for causing a first application to enter a non-windowlet state from a windowlet state, acquires and saves a first state information when the first application is in the windowlet state, acquires a third event for causing the first application to enter the windowlet state from the non-windowlet state, determines a second transform parameter based on the first state information, and transforms the fullscreen window of the first application with the second transform parameter to generate a windowlet corresponding to the first state information. In this way, when an application is recovered to the foreground from the background or the Killed state, or when a window for the application is opened again, the state information of the windowlet for the application is saved. By saving history windowlet data during the user's operation, the user can be provided with more secure and reliable window recovery mechanism, and thus better user experience.

Figure 14:
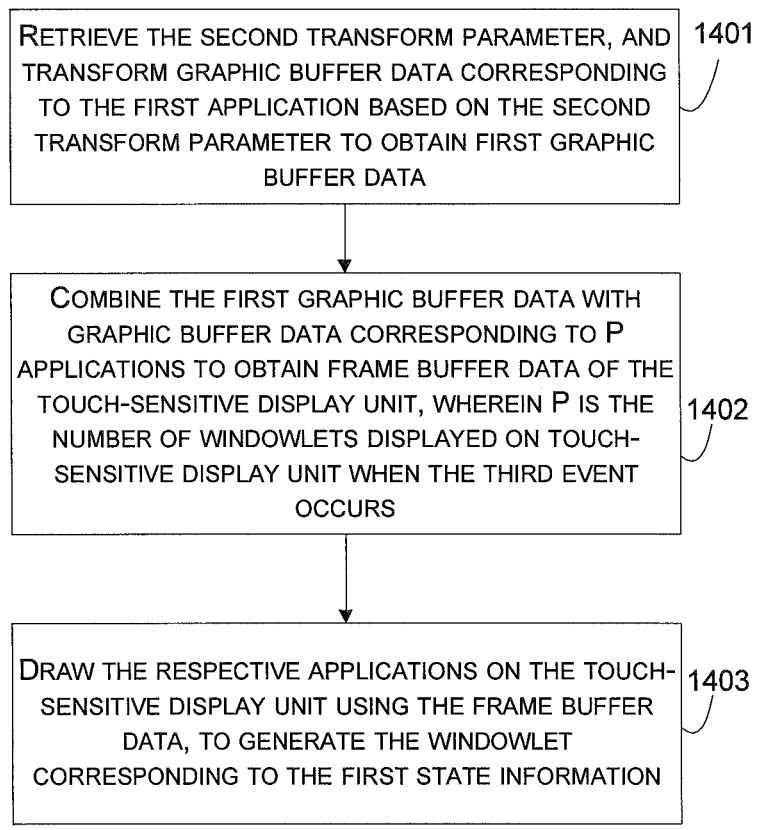
FIG. 14 is a schematic flowchart of an implementation of step 1305 according to an embodiment of the present disclosure.

An information processing method according to an embodiment of the present disclosure is provided based on the above embodiment. FIG. 14 is a schematic flowchart of step 1305 according to an embodiment of the present disclosure. As shown in FIG. 14, step 1305 in FIG. 13 further includes:

Step 1401: retrieving the second transform parameter, and transforming graphic buffer data corresponding to the first application based on the second transform parameter to obtain first graphic buffer data.

Here, the graphic buffer data corresponding to the first application may be RGB (Red, Green, Blue) data. The electronic device according to the present embodiment includes two buffer areas, which are a graphic buffer area and a frame buffer area respectively. The graphic buffer area is used to store RGB data for first application drawing; and the frame buffer area is used to store frame buffer data after the graphic buffer data is combined. As such, the content displayed in the display area of the screen of the electronic device is complete frame data.

Step 1402: combining the first graphic buffer data with graphic buffer data corresponding to P applications to obtain frame buffer data of the touch-sensitive display unit, wherein P is the number of windowlets displayed on touch-sensitive display unit when the third event occurs.

Here, the P applications refer to applications displayed in windowlets on the electronic device when the third event occurs. For example, there are two applications A and B displayed in windowlets on the electronic device when the second event occurs. If the second event occurs to turn off the application A, the state information of the windowlet for the application A will be saved. When the third event occurs, there are three applications C, D and E displayed in windowlets on the electronic device. Here, P is equal to 3. Following the occurrence of the third event, the applications A, C, D and E each will be displayed in a windowlet on the display screen. In combing the graphic buffer data into the frame buffer data, it is necessary to acquire not only the graphic buffer data for the application A but also the graphic buffer data for the applications C, D and E, so that these applications A, C, D and E can be combined into complete frame buffer.

Step 1403: drawing the respective applications on the touch-sensitive display unit using the frame buffer data, to generate the windowlet corresponding to the first state information.

In the present embodiment, the operation system can restore an application to a previous windowlet state if the operation system records the matrix of the application during the previous execution. This transform process involves only scaling down the window without modification on the first application. Therefore, the information processing method according the present embodiment has good compatibility. The previously recorded matrix is used to transform the fullscreen window into the windowlet, and thus the content displayed in the windowlet is consistent with that displayed in the fullscreen window. This avoids incomplete or failed display of the content.

When two windowlets overlap, an application corresponding to one of the windowlets may be displayed in semi-transparency by changing the transparency by information of the windowlet. For example, when the user activates a video application and an instant chat application at the same time, the user wants the video application to be as large as possible, but does not want to miss any chat information sent from friends. At this time, the user can watch video while chatting by setting the transparency by information of the instant chat application to semi-transparency, and placing the video application beneath the instant chat application.

Figure 15:
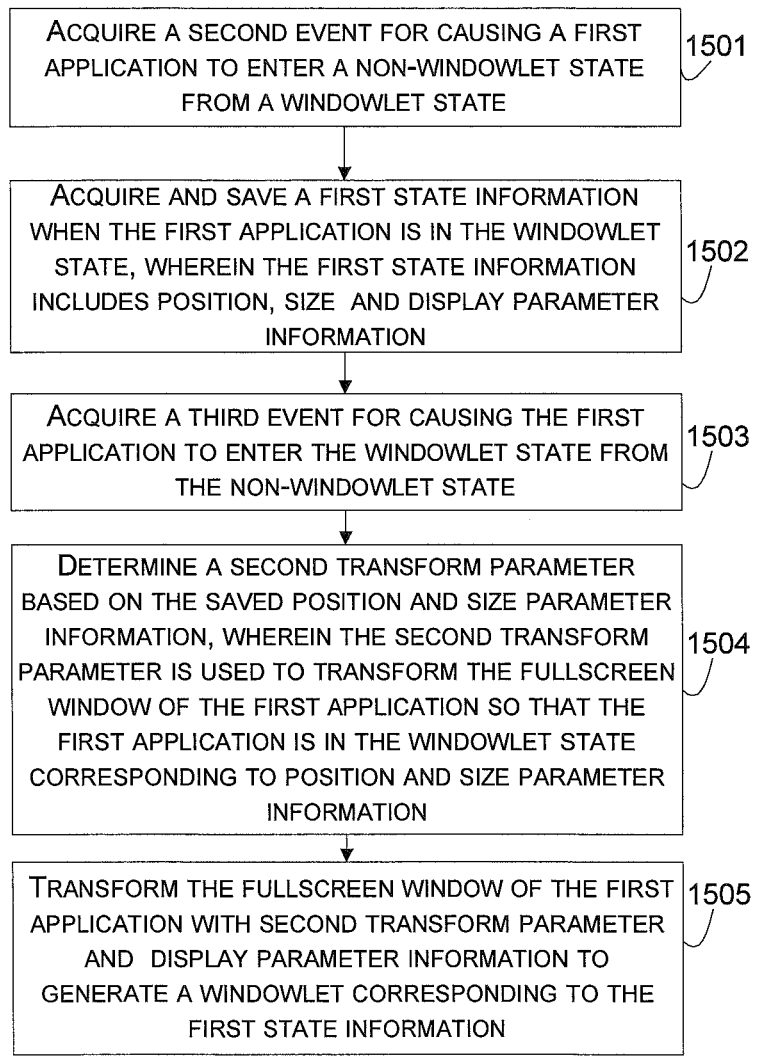
FIG. 15 is a schematic flowchart of the information processing method according to an embodiment of the present disclosure.

An information processing method according to an embodiment of the present disclosure is provided based on the above embodiment. The information processing method is applied in an electronic device that includes a touch-sensitive display unit and is able to execute an application. The information processing method includes acquiring a first event; acquiring a first transform parameter based on the first event; transforming the fullscreen window for the application with the first transform parameter to generate a windowlet for the application so that the application is in a windowlet state. FIG. 15 is a schematic flowchart of the information processing method according to an embodiment of the present disclosure. As shown in FIG. 15, the information processing method includes:

Step 1501: acquiring a second event for causing a first application to enter a non-windowlet state from a windowlet state.

Here, the non-windowlet state may include a fullscreen window state, a background state, a turnoff state, or a Killed state. The Killed state refers to a state where the user causes the first application to exit from the task manager by using a Kill command. Generally, the first application remains in the task manager after it is turned off, so that the first application can be quickly activated next time.

The second event may occur in the following scenarios. For example, when the user has installed a one-key-clearup application, and the user activates the application, an application will be killed. Therefore, activation of the one-key-clearup application will cause the first application in the windowlet state to enter the Killed state. As another example, if an application has bug, the application will collapse during its execution, and cause the first application in the windowlet state to enter the turnoff state. As still another example, when the memory of the electronic device is insufficient, the operating system will automatically kill some applications, and thus cause the applications in the windowlet state to enter the Killed state. In practical implementations, the second event is triggered as long as the second event can cause the first application to enter a non-windowlet state from a windowlet state. Details thereof will be omitted here.

Step 1502: acquiring and saving a first state information when the first application is in the windowlet state, wherein the first state information includes position parameter information, size parameter information and display parameter information.

The display parameter information includes at least transparency parameter information which may be measured with a value between 0 and 1. For example, the transparency parameter information of 1 indicates full transparency, 0 indicates complete opaqueness, and 0.5 indicates a transparency of 50%. This may be implemented in any method known to those skilled in the art. In an example using an operation system, Android, the transparency parameter in Android may be directly retrieved and set according to relevant content in the operation system. Details thereof will be omitted here.

Step 1503: acquiring a third event for causing the first application to enter the windowlet state from the non-windowlet state.

Here, the third event is similar to the second event. In practical implementations, the third event is triggered as long as it can cause the first application to enter a windowlet state from a non-windowlet state. Details thereof will be omitted here.

Step 1504: determining a second transform parameter based on the saved position parameter information and size parameter information, wherein the second transform parameter is used to transform the fullscreen window of the first application so that the first application is in the windowlet state corresponding to position parameter information and size parameter information in the first state information.

Here, the second transform parameter is similar to the first transform parameter, and details thereof will be omitted here.

Step 1505: transforming the fullscreen window of the first application with the second transform parameter and the display parameter information to generate a windowlet corresponding to the first state information.

The present embodiment provides an information processing method capable of recording the display parameter information, especially the transparency information of a windowlet. When an application is recovered to the foreground from the background or the Killed state, or when a window for the application is opened again, the state information and display parameter information of the windowlet for the application are saved. By saving history windowlet data during the user's operation, the user can be provided with more secure and reliable window recovery mechanism, and thus better user experience.

Figure 16:
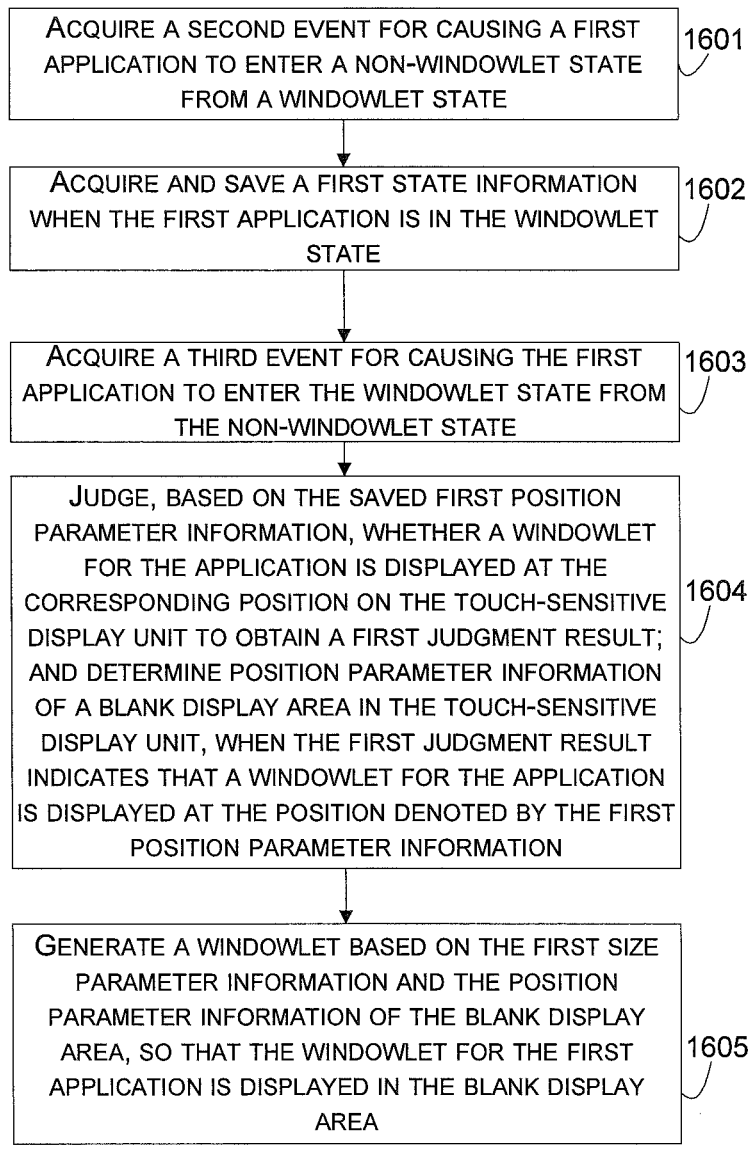
FIG. 16 is a schematic flowchart of an information processing method according to an embodiment of the present disclosure.

An information processing method according to an embodiment of the present disclosure is provided. The information processing method is applied in an electronic device that includes a touch-sensitive display unit and is able to execute an application. The information processing method includes acquiring a first event; acquiring a first transform parameter based on the first event; transforming the fullscreen window for the application with the first transform parameter to generate a windowlet for the application so that the application is in a windowlet state. FIG. 16 is a schematic flowchart of the information processing method according to an embodiment of the present disclosure. As shown in FIG. 16, the information processing method includes:

Step 1601: acquiring a second event for causing a first application to enter a non-windowlet state from a windowlet state.

Here, the non-windowlet state may include a fullscreen window state, a background state, a turnoff state, or a Killed state. The Killed state refers to a state where the user causes the first application to exit from the task manager by using a Kill command. Generally, the first application remains in the task manager after it is turned off, so that the first application can be quickly activated next time.

The second event may occur in the following scenarios. For example, when the user has installed a one-key-clearup application, and the user activates the application, an application will be killed. Therefore, activation of the one-key-clearup application will cause the first application in the windowlet state to enter the Killed state. As another example, if an application has bug, the application will collapse during its execution, and cause the first application in the windowlet state to enter the turnoff state. As still another example, when the memory of the electronic device is insufficient, the operating system will automatically kill some applications, and thus cause the applications in the windowlet state to enter the Killed state. In practical implementations, the second event is triggered as long as the second event can cause the first application to enter a non-windowlet state from a windowlet state. Details thereof will be omitted here.

Step 1602: acquiring and saving a first state information when the first application is in the windowlet state, wherein the first state information includes position parameter information and size parameter information.

Step 1603: acquiring a third event for causing the first application to enter the windowlet state from the non-windowlet state.

Here, the third event is similar to the second event. In practical implementations, the third event is triggered as long as it can cause the first application to enter a windowlet state from a non-windowlet state. Details thereof will be omitted here.

Step 1604: judging, based on the saved first position parameter information, whether a windowlet for the application is displayed at the corresponding position on the touch-sensitive display unit to obtain a first judgment result; and determining position parameter information of a blank display area in the touch-sensitive display unit, when the first judgment result indicates that a windowlet for the application is displayed at the position denoted by the first position parameter information.

Step 1605: generating a windowlet corresponding to the first size parameter information based on the first size parameter information and the position parameter information of the blank display area, so that the windowlet for the first application is displayed in the blank display area.

The present embodiment generates a windowlet corresponding to the first size parameter information based on the first size parameter information and the position parameter information of the blank display area, so that the windowlet for the first application is displayed in the blank display area. By saving history windowlet data during the user's operation, the user can be provided with more secure and reliable window recovery mechanism, and thus better user experience.

In the embodiments of FIGS. 13, and 16, the step of acquiring the first, second or third event may include step A1 and step A2.

Step A1: detecting whether a touch operation satisfying a first predetermined condition occurs.

A touch operation satisfying a first predetermined condition may be implemented as a single-click touch operation, a double-click touch operation, a three-finger touch operation or a five-finger touch operation.

Step A2: determining the acquisition of first, second or third event when the touch operation satisfying a first predetermined condition occurs.

In the embodiments of FIGS. 13, and 16, the step of acquiring the first, second or third event may include step B1 and step B2.

Step B1: detecting whether a key operation satisfying a second predetermined condition occurs.

A key operation satisfying a second predetermined condition may be implemented as pressing a key for a long time, such as pressing a functional key (HOME) for more than 2 seconds, or pressing a combination of keys, such as combination of keys HOME and BACK.

Step B2: determining the acquisition of first, second or third event when the key operation satisfying the second predetermined condition occurs.

In the embodiments of FIGS. 13, and 16, the step of acquiring the first, second or third event may include step C1 and step C2.

Step C1: detecting whether a posture change in the electronic device satisfying a third predetermined condition occurs;

Step C2: determining the acquisition of first, second or third event when a posture change in the electronic device satisfying the third predetermined condition occurs.

Here, the posture change may be a change in the position of the electronic device. The first operation may be a sound-controlled operation. In the present embodiment, the first operation may be any of various operations on interactive objects in the multi-window manager. Details thereof will be omitted.

In the embodiments of FIGS. 13, and 16, the step of acquiring the first, second or third event may include step D1 and step D2.

Step D1: detecting whether a voice operation satisfying a fourth predetermined condition occurs.

Step D2: determining the acquisition of first, second or third event when a voice operation satisfying the fourth predetermined condition occurs.

Figure 17:
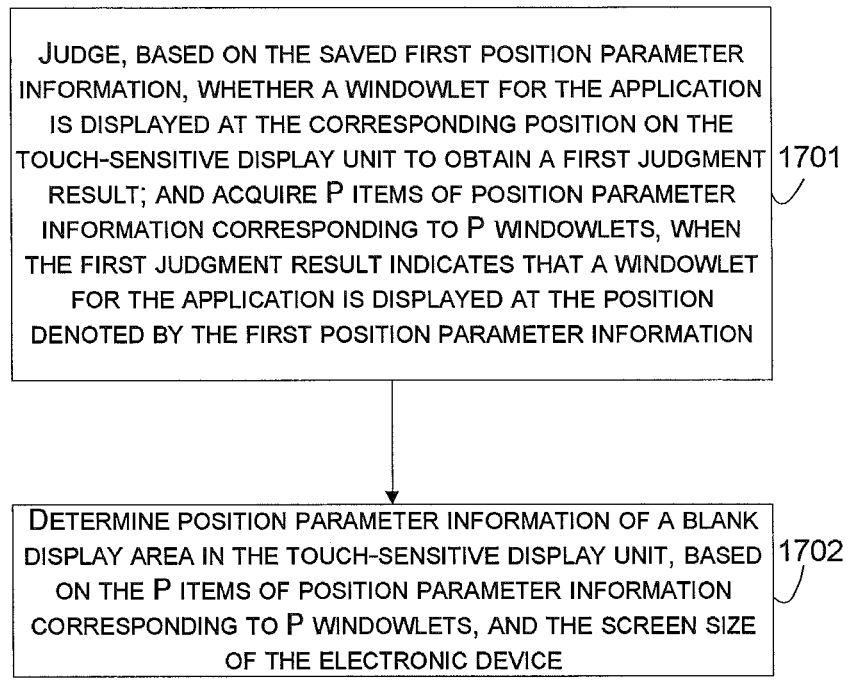
FIG. 17 is a schematic flowchart of an implementation of step 1604 according to an embodiment of the present disclosure.

An information processing method according to an embodiment of the present disclosure is provided based on the above embodiment. FIG. 17 is a schematic flowchart of step 1604 according to an embodiment of the present disclosure. As shown in FIG. 17, step 1604 in FIG. 16 further includes:

Step 1701: judging, based on the saved first position parameter information, whether a windowlet for the application is displayed at the corresponding position on the touch-sensitive display unit to obtain a first judgment result; and acquiring P items of position parameter information corresponding to P windowlets, when the first judgment result indicates that a windowlet for the application is displayed at the position denoted by the first position parameter information.

Step 1702: determining position parameter information of a blank display area in the touch-sensitive display unit, based on the P items of position parameter information corresponding to P windowlets, and the screen size of the electronic device.

Figure 18:
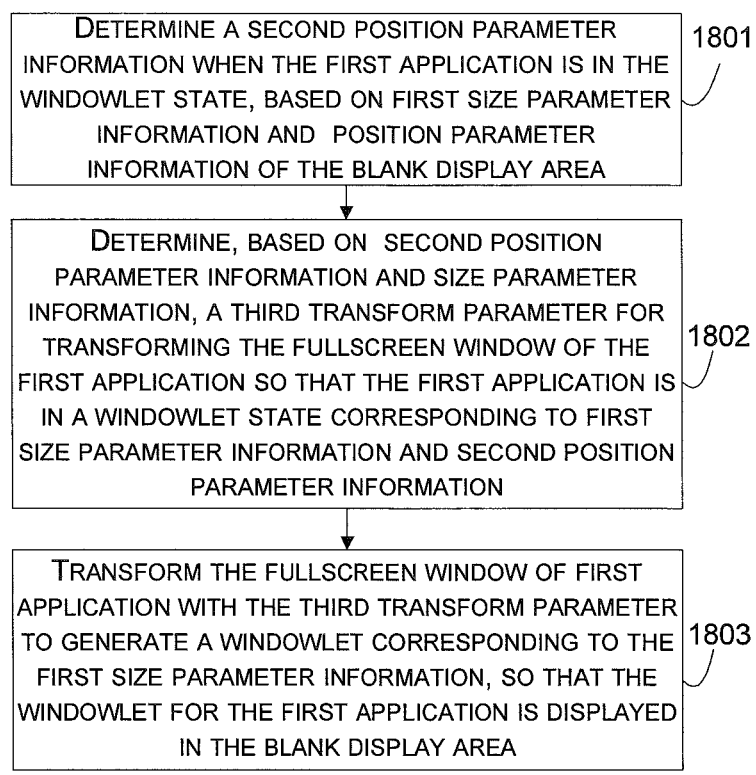
FIG. 18 is a schematic flowchart of an implementation of step 1605 according to an embodiment of the present disclosure.

An information processing method according to an embodiment of the present disclosure is provided based on the above embodiment. FIG. 18 is a schematic flowchart of step 1605 according to an embodiment of the present disclosure. As shown in FIG. 18, step 1605 in FIG. 16 further includes: Step 1801: determining a second position parameter information when the first application is in the windowlet state, based on the first size parameter information and the position parameter information of the blank display area; Step 1802: determining, based on the second position parameter information and the first size parameter information, a third transform parameter for transforming the fullscreen window of the first application so that the first application is in a windowlet state corresponding to the first size parameter information and the second position parameter information; Step 1803: transforming the fullscreen window of the first application with the third transform parameter to generate a windowlet corresponding to the first size parameter information, so that the windowlet for the first application is displayed in the blank display area.

Figure 19:
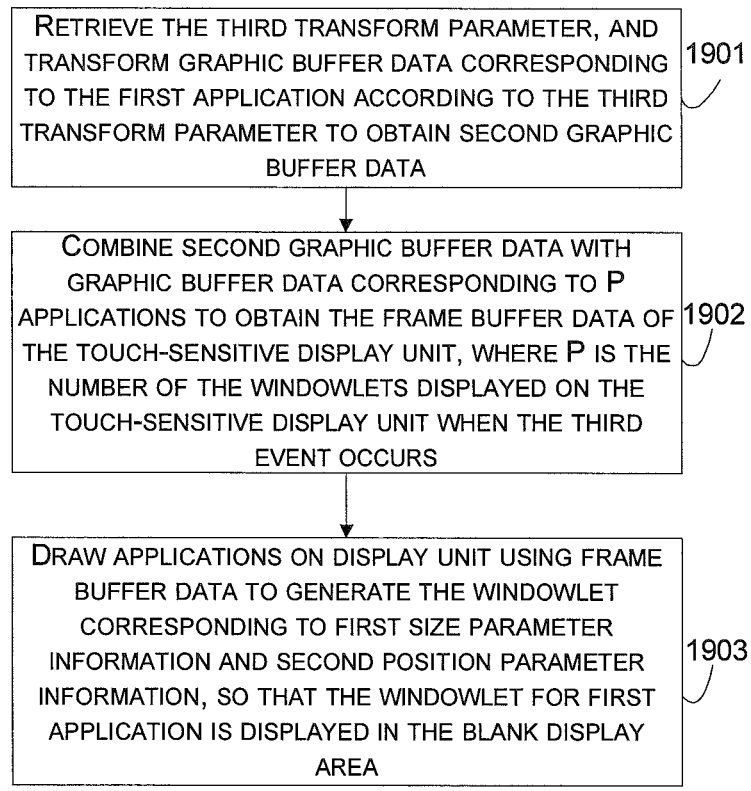
FIG. 19 is a schematic flowchart of an implementation of step 1603 according to an embodiment of the present disclosure.

An information processing method according to an embodiment of the present disclosure is provided based on the above embodiment. FIG. 19 is a schematic flowchart of step 1803 according to an embodiment of the present disclosure. As shown in FIG. 19, step 1803 in FIG. 18 further includes: Step 1901: retrieving the third transform parameter, and transforming graphic buffer data corresponding to the first application according to the third transform parameter to obtain second graphic buffer data; Step 1902: combining the second graphic buffer data with graphic buffer data corresponding to the P applications to obtain the frame buffer data of the touch-sensitive display unit, where P is the number of the windowlets displayed on the touch-sensitive display unit when the third event occurs; Step 1903: drawing the application on the touch-sensitive display unit using the frame buffer data to generate the windowlet corresponding to the first size parameter information and the second position parameter information, so that the windowlet for the first application is displayed in the blank display area.

Figure 20:
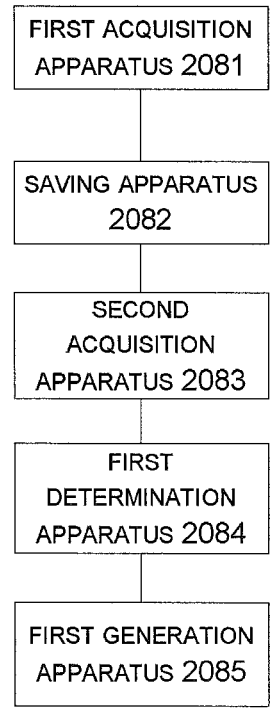
FIG. 20 is a schematic block diagram of an electronic device according to an embodiment of the present disclosure.

An embodiment of the present disclosure provides an electronic device that includes a touch-sensitive display unit. The electronic device is configured to acquire a first event for presenting the application in a windowlet within a display region of the display unit, wherein the size of the windowlet is smaller than that of a fullscreen window; acquire a first transform parameter based on the first event; transform the fullscreen window for the application with the first transform parameter to generate a windowlet for the application so that the application is in a windowlet state. FIG. 20 is a schematic block diagram of the electronic device according to the present embodiment. As shown in FIG. 20, the electronic device includes a first acquisition apparatus 2081, a saving apparatus 2082, a second acquisition apparatus 2083, a first determination apparatus 2084 and a first generation apparatus 2085.

The first acquisition apparatus 2081 is configured to acquire a second event for causing a first application to enter a non-windowlet state from a windowlet state.

Here, the second event is used to cause a first application to enter a non-windowlet state from a windowlet state. The non-windowlet state may include a fullscreen window state, a background state, a turnoff state, or a Killed state. The Killed state refers to a state where the user causes the first application to exit from the task manager by using a Kill command. Generally, the first application remains in the task manager after it is turned off, so that the first application can be quickly activated next time.

The second event may occur in the following scenarios. For example, when the user has installed a one-key-clearup application, and the user activates the application, an application will be killed. Therefore, activation of the one-key-clearup application will cause the first application in the windowlet state to enter the Killed state. As another example, if an application has bug, the application will collapse during its execution, and cause the first application in the windowlet state to enter the turnoff state. As still another example, when the memory of the electronic device is insufficient, the operating system will automatically kill some applications, and thus cause the applications in the windowlet state to enter the Killed state. In practical implementations, the second event is triggered as long as the second event can cause the first application to enter a non-windowlet state from a windowlet state. Details thereof will be omitted here.

The saving apparatus 2082 is configured to acquire and save a first state information when the first application is in the windowlet state, wherein the first state information includes position parameter information and size parameter information.

The second acquisition apparatus 2083 is configured to acquire a third event for causing the first application to enter the windowlet state from the non-windowlet state.

Here, the third event is similar to the second event. In practical implementations, the third event is triggered as long as it can cause the first application to enter a windowlet state from a non-windowlet state. Details thereof will be omitted here.

The first determination apparatus 2084 is configured to determine a second transform parameter based on the position parameter information and size parameter information in the saved first state information, wherein the second transform parameter is used to transform the fullscreen window of the first application so that the first application is in the windowlet state corresponding to the first state information.

Here, the second transform parameter is similar to the first transform parameter, and details thereof will be omitted here.

The first generation apparatus 2085 is configured to transform the fullscreen window of the first application with the second transform parameter to generate a windowlet corresponding to the first state information.

The present embodiment acquires, by the first acquisition apparatus 2081, a second event for causing a first application to enter a non-windowlet state from a windowlet state, acquires and saves, by the saving apparatus 2082, a first state information when the first application is in the windowlet state, acquires, by the second acquisition apparatus 2083, a third event for causing the first application to enter the windowlet state from the non-windowlet state, determines, by the first determination apparatus 2084, a second transform parameter based on the first state information, and transforms, by the first generation apparatus 2085, the fullscreen window of the first application with the second transform parameter to generate a windowlet corresponding to the first state information. In this way, when an application is recovered to the foreground from the background or the Killed state, or when a window for the application is opened again, the state information of the windowlet for the application is saved. By saving history windowlet data during the user's operation, the user can be provided with more secure and reliable window recovery mechanism, and thus better user experience.

Figure 21:
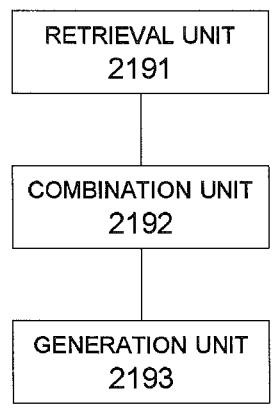
FIG. 21 is a schematic block diagram of a first generation apparatus according to an embodiment of the present disclosure.

An electronic device according to an embodiment of the present disclosure is provided based on the above embodiment. FIG. 21 is a schematic block diagram of the first generation apparatus according to an embodiment of the present disclosure. As shown in FIG. 21, the first generation apparatus further includes a retrieval unit 2191, a combination unit 2192, and a generation unit 2193.

The retrieval unit 2191 is configured to retrieve the second transform parameter, and transform graphic buffer data corresponding to the first application based on the second transform parameter to obtain first graphic buffer data.

Here, the graphic buffer data corresponding to the first application may be RGB (Red, Green, Blue) data. The electronic device according to the present embodiment includes two buffer areas, which are a graphic buffer area and a frame buffer area respectively. The graphic buffer area is used to store RGB data for first application drawing; and the frame buffer area is used to store frame buffer data after the graphic buffer data is combined. As such, the content displayed in the display area of the screen of the electronic device is complete frame data.

combination unit 2192 is configured to combine the first graphic buffer data with graphic buffer data corresponding to P applications to obtain frame buffer data of the touch-sensitive display unit, wherein P is the number of windowlets displayed on touch-sensitive display unit when the third event occurs.

Here, the P applications refer to applications displayed in windowlets on the electronic device when the third event occurs. For example, there are two applications A and B displayed in windowlets on the electronic device when the second event occurs. If the second event occurs to turn off the application A, the state information of the windowlet for the application A will be saved. When the third event occurs, there are three applications C, D and E displayed in windowlets on the electronic device. Here, P is equal to 3. Following the occurrence of the third event, the applications A, C, D and E each will be displayed in a windowlet on the display screen. In combing the graphic buffer data into the frame buffer data, it is necessary to acquire not only the graphic buffer data for the application A but also the graphic buffer data for the applications C, D and E, so that these applications A, C, D and E can be combined into complete frame buffer.

The generation unit 2193 is configured to draw the respective applications on the touch-sensitive display unit using the frame buffer data, to generate the windowlet corresponding to the first state information.

In the present embodiment of FIG. 21, the operation system can restore an application to a previous windowlet state if the operation system records the matrix of the application during the previous execution. This transform process involves only scaling down the window without modification on the first application. Therefore, the electronic device according the present embodiment has good compatibility. The previously recorded matrix is used to transform the fullscreen window into the windowlet, and thus the content displayed in the windowlet is consistent with that displayed in the fullscreen window. This avoids incomplete or failed display of the content.

When two windowlets overlap, an application corresponding to one of the windowlets may be displayed in semi-transparency by changing the transparency by information of the windowlet. For example, when the user activates a video application and an instant chat application at the same time, the user wants the video application to be as large as possible, but does not want to miss any chat information sent from friends. At this time, the user can watch video while chatting by setting the transparency by information of the instant chat application to semi-transparency, and placing the video application beneath the instant chat application.

An electronic device according to an embodiment of the present disclosure is provided based on the above embodiments of FIGS. 20 and 21. In this embodiment, the saving apparatus is further configured to acquire and save display parameter information when the first application is in a windowlet state.

Accordingly, the generation apparatus is further configured to transform the fullscreen window of the first application using the position parameter information, the size parameter information and the display parameter information to generate a windowlet corresponding to the first state information and the transparency information.

The present embodiment provides an electronic device capable of recording the display parameter information, especially the transparency information of a windowlet. When an application is recovered to the foreground from the background or the Killed state, or when a window for the application is opened again, the state information and display parameter information of the windowlet for the application are saved. By saving history windowlet data during the user's operation, the user can be provided with more secure and reliable window recovery mechanism, and thus better user experience.

Figure 22:
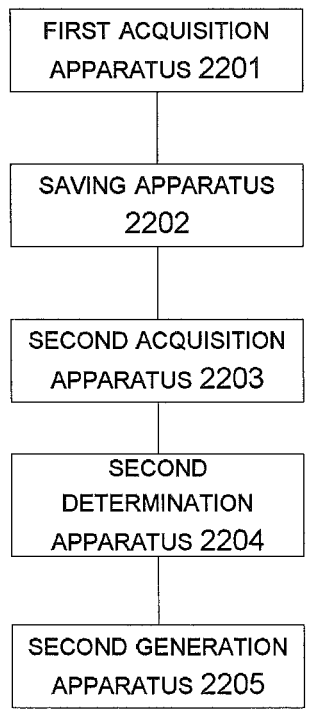
FIG. 22 is a schematic block diagram of an electronic device according to an embodiment of the present disclosure.

An electronic device according to an embodiment of the present disclosure is provided. The electronic device includes a touch-sensitive display unit, and is configured to acquire a first event for presenting the application in a windowlet within a display region of the display unit, wherein the size of the windowlet is smaller than that of a fullscreen window; acquire a first transform parameter based on the first event; transform the fullscreen window for the application with the first transform parameter to generate a windowlet for the application so that the application is in a windowlet state. FIG. 22 is a schematic block diagram of the electronic device according to the present embodiment. As shown in FIG. 22, the electronic device includes a first acquisition apparatus 2201, a saving apparatus 2202, a second acquisition apparatus 2203, a second determination apparatus 2204 and a second generation apparatus 2205.

The first acquisition apparatus 2201 is configured to acquire a second event for causing a first application to enter a non-windowlet state from a windowlet state.

Here, the second event is used for causing a first application to enter a non-windowlet state from a windowlet state. The non-windowlet state may include a fullscreen window state, a background state, a turnoff state, or a Killed state. The Killed state refers to a state where the user causes the first application to exit from the task manager by using a Kill command. Generally, the first application remains in the task manager after it is turned off, so that the first application can be quickly activated next time.

The second event may occur in the following scenarios. For example, when the user has installed a one-key-clearup application, and the user activates the application, an application will be killed. Therefore, activation of the one-key-clearup application will cause the first application in the windowlet state to enter the Killed state. As another example, if an application has bug, the application will collapse during its execution, and cause the first application in the windowlet state to enter the turnoff state. As still another example, when the memory of the electronic device is insufficient, the operating system will automatically kill some applications, and thus cause the applications in the windowlet state to enter the Killed state. In practical implementations, the second event is triggered as long as the second event can cause the first application to enter a non-windowlet state from a windowlet state. Details thereof will be omitted here.

The saving apparatus 2202 is configured to acquire and save a first state information when the first application is in the windowlet state, wherein the first state information includes first position parameter information and first size parameter information.

The second acquisition apparatus 2203 is configured to acquire a third event for causing the first application to enter the windowlet state from the non-windowlet state.

Here, the third event is similar to the second event. In practical implementations, the third event is triggered as long as it can cause the first application to enter a windowlet state from a non-windowlet state. Details thereof will be omitted here.

The second determination apparatus 2204 is configured to judge, based on the saved first position parameter information, whether a windowlet for the application is displayed at the corresponding position on the touch-sensitive display unit to obtain a first judgment result; and determine position parameter information of a blank display area in the touch-sensitive display unit, when the first judgment result indicates that a windowlet for the application is displayed at the position denoted by the first position parameter information.

The second generation apparatus 2205 is configured to transform the fullscreen window of the first application using the second transform parameter to generate a windowlet corresponding to the first state information.

The present embodiment generates a windowlet corresponding to the first size parameter information based on the first size parameter information and the position parameter information of the blank display area, so that the windowlet for the first application is displayed in the blank display area. By saving history windowlet data during the user's operation, the user can be provided with more secure and reliable window recovery mechanism, and thus better user experience.

Preferably, the first or second acquisition apparatus may include a detection unit and a determination unit.

The detection unit is configured to detect whether a touch operation satisfying a first predetermined condition occurs. The determination unit is configured to determine the acquisition of first, second or third event when the touch operation satisfying a first predetermined condition occurs.

Alternatively, the detection unit is configured to detect whether a key operation satisfying a second predetermined condition occurs. The determination unit is configured to determine the acquisition of first, second or third event when the key operation satisfying the second predetermined condition occurs.

Alternatively, the detection unit is configured to detect whether a posture change in the electronic device satisfying a third predetermined condition occurs. The determination unit is configured to determine the acquisition of first, second or third event when a posture change in the electronic device satisfying the third predetermined condition occurs.

Alternatively, the detection unit is configured to detect whether a voice operation satisfying a fourth predetermined condition occurs. The determination unit is configured to determine the acquisition of first, second or third event when a voice operation satisfying the fourth predetermined condition occurs.

Here, the touch operation satisfying a first predetermined condition may be implemented as a single-click touch operation, a double-click touch operation, a three-finger touch operation or a five-finger touch operation.

Here, the key operation satisfying a second predetermined condition may be implemented as pressing a key for a long time, such as pressing a functional key (HOME) for more than 2 seconds, or pressing a combination of keys, such as combination of keys HOME and BACK.

Here, the posture change may be a change in the position of the electronic device. The first operation may be a sound-controlled operation. In the present embodiment, the first operation may be any of various operations on interactive objects in the multi-window manager. Details thereof will be omitted.

In the above solutions, the second determination apparatus may further include a first acquisition unit and a third determination unit.

The first acquisition unit is configured to judge, based on the saved first position parameter information, whether a windowlet for the application is displayed at the corresponding position on the touch-sensitive display unit to obtain a first judgment result; and acquire P items of position parameter information corresponding to P windowlets, when the first judgment result indicates that a windowlet for the application is displayed at the position denoted by the first position parameter information.

The third determination unit is configured to determine position parameter information of a blank display area in the touch-sensitive display unit, based on the P items of position parameter information corresponding to P windowlets, and the screen size of the electronic device.

In the above solutions, the second determination apparatus may further include a fourth determination unit, a fifth determination unit, and a second generation unit.

The fourth determination unit is configured to determine a second position parameter information when the first application is in the windowlet state, based on the first size parameter information and the position parameter information of the blank display area;

The fifth determination unit is configured to determine, based on the second position parameter information and the first size parameter information, a third transform parameter for transforming the fullscreen window of the first application so that the first application is in a windowlet state corresponding to the first size parameter information and the second position parameter information;

The second generation unit is configured to transform the fullscreen window of the first application with the third transform parameter to generate a windowlet corresponding to the first size parameter information, so that the windowlet for the first application is displayed in the blank display area.

In the above solutions, the second generation unit further includes a transform module, a combination module and a generation module.

The transform module is configured to retrieve the third transform parameter, and transform graphic buffer data corresponding to the first application according to the third transform parameter to obtain second graphic buffer data;

The combination module is configured to combine the second graphic buffer data with graphic buffer data corresponding to the P applications to obtain the frame buffer data of the touch-sensitive display unit, where P is the number of the windowlets displayed on the touch-sensitive display unit when the third event occurs;

The generation module is configured to draw the application on the touch-sensitive display unit using the frame buffer data to generate the windowlet corresponding to the first size parameter information and the second position parameter information, so that the windowlet for the first application is displayed in the blank display area.

Figure 23:
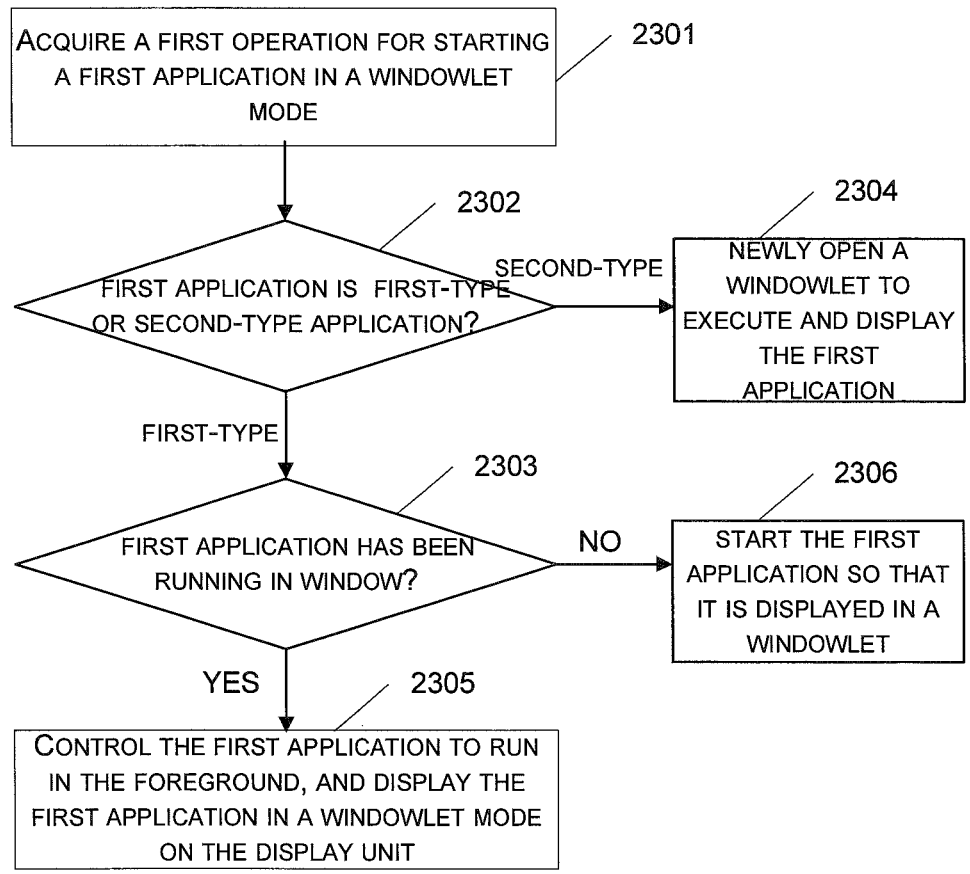
FIG. 23 is a schematic flowchart showing an implementation of a method embodiment of the present disclosure.

An information processing method according to an embodiment of the present disclosure is applied in an electronic device. The electronic device includes a display unit including a display region, and is capable of executing multiple applications and displaying the multiple applications in multiple windows at the same time. the multiple applications include first-type and second-type applications. The multiple windows include windowlets and/or fullscreen windows. The windowlet is smaller than the fullscreen window and is obtained by transforming the fullscreen window using a first parameter. As shown in FIG. 23, the method includes: Step 2301: acquiring a first operation for starting a first application in a windowlet mode; Steps 2302: in response to the first operation, judging whether the first application is a first-type or second-type application; proceeding to step 2303 if the first application is determined as a first-type application, and proceeding to step 2304 if the first application is determined as a second-type application; Step 2303: judging whether the first application has been running in the window to generate a judgment result; proceeding to step 2305 if the judgment result is Yes, and proceeding to step 2306 if the judgment result is No; Step 2304: newly opening a windowlet to execute and display the first application; Step 2305: controlling the first application to run in the foreground, and displaying the first application in a windowlet mode on the display unit; Step 2306: starting the first application so that the first application is displayed in a windowlet.

The present embodiment processes different types of applications respectively according to the judgment branches at steps 2303 and 2304. In the case that the first application is of a first type, it is judged whether the first application has been running in a window to generate a judgment result. If the judgment result is Yes, the first application is controlled to run in the foreground, and displayed in a windowlet mode on the display unit. If the judgment result is No, the first application is started so that the first application is displayed in a windowlet. In the case that the first application is of a second type, a windowlet is newly opened to execute and display the first application. By processing different types of applications in different ways, the different types of applications running in the windowlet mode can be properly handled.

To be noted, among the multiple windows, the display area of a windowlet is smaller than that of a fullscreen window, and the windowlet is transformed from the fullscreen window using a first parameter, which may be at least one of a parameter value, a matrix, a group of parameters, or a set of parameters.

The first application, the windowlet and the fullscreen window in the multiple windows, and the principle of obtaining the windowlet by transforming the fullscreen window using the first parameter are described as follows. In the following embodiments of the present disclosure, description related to these terms and the principle of window transform will be omitted.

In the embodiment of the present disclosure, the first application installed in the electronic device may be an application built in the electronic device system, for example, a clock application, a calculator application, a camera application, and an address book application, or may be a third-party application installed by a user, for example, a game application, a WeChat application, a browser application, an instant chat application, a mail application etc.

In general, each of the first applications is displayed in a form of an interactive object on the desktop of the electronic device and corresponds to one interactive object. The interactive object may be an object logo, which is generally an icon. A first application corresponding to an object logo of the first application may be started by operating the object logo. For example, on the desktop of the electronic device such as a mobile phone, when a user touches an icon of the address book application, the address book application may be started, to enable the address book recorded in the address book application to be displayed on the display screen of the electronic device. When the first application is started through the desktop, the first application will be displayed in a form of fullscreen window on the display screen of the electronic device.

In the embodiment of the present disclosure, the first parameter may be pre-stored in a database of the electronic device. For example, in practical applications, the first parameter may be represented in a form of matrix, or in a form of a group of parameters. Each of the parameters in the group may be a numerical value, or a vector. In the following, the first parameter will be represented in a form of a matrix, and thus defined as a first matrix in the embodiment of the present disclosure. The first matrix may be pre-stored in a matrix function library of the electronic device. The fullscreen window of the first application may be transformed into a windowlet using the first matrix. For example, transforms such as scale-down, translation and shape transform may be applied to the fullscreen window to convert the fullscreen window into a windowlet.

Graphical buffer data of the first application in the fullscreen window may be transformed into graphical buffer data of the first application in the windowlet using the first matrix. With the transform of the graphical buffer data in the fullscreen window, a display effect can be achieved that the fullscreen window of the first application is scaled down to a windowlet, and thus the first application is displayed in the windowlet on the display screen of the electronic device. Meanwhile, the first matrix may also be used to perform, for example, a translation transform, a shape transform, or an angle transform on the windowlet.

Preferably, the first matrix may be preset by a manufacturer of the electronic device, or may be set manually by a user on the electronic device. In order to facilitate the user in setting the first matrix manually, the electronic device provides a function of automatically generating a matrix. The user may simply set certain parameters related to the first matrix, for example, a window horizontal coordinate scale parameter, a window longitudinal coordinate scale parameter, a window translation parameter, a window shape parameter, and a window angle rotation parameter, and then the electronic device may generate a corresponding first matrix based on these parameters.

Figure 24:
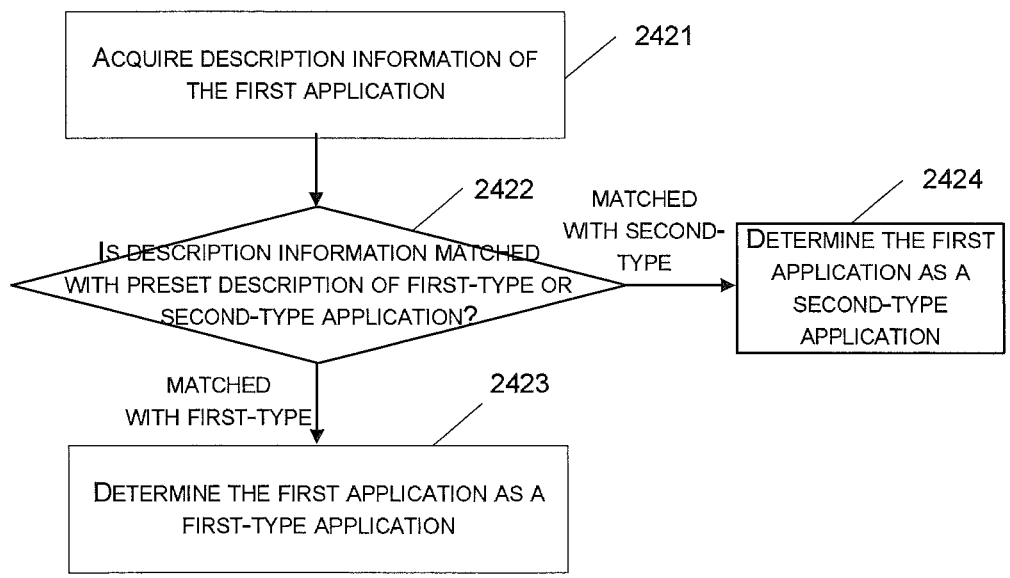
FIG. 24 is a schematic flowchart showing a judgment process of judging whether a first application is a first-type or second-type application in a method embodiment of the present disclosure.
Figure 25:
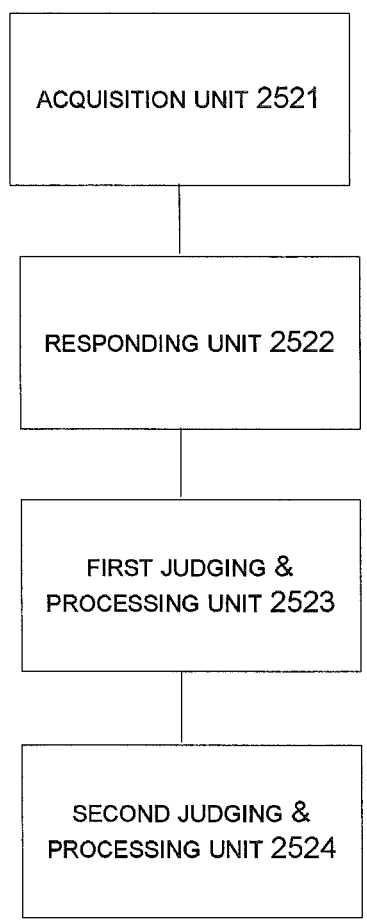
FIG. 25 is a schematic block diagram of an electronic device embodiment of the present disclosure.

In the present embodiment, as shown in FIG. 24, judging whether the first application is a first-type or second-type application in step 2302 may includes: Step 2421: acquiring description information of the first application; Step 2422: judging whether the description information of the first application is matched with a preset description of a first-type application or a preset description of a second-type application; proceeding to step 2423 if the description information of the first application is matched with the preset description of a first-type application, and proceeding to step 2424 if the description information of the first application is matched with the preset description of a second-type application; Step 2423: determining the first application as a first-type application; Step 2424: determining the first application as a second-type application.

As can been seen from FIG. 24, judging whether the first application is a first-type or second-type application in step 2302 also involves judgment branches. For the first application, it is also necessary to determine whether it is of a first or second type, so that different types of applications can be processed in different ways, and the different types of applications running in the windowlet mode can be properly handled.

In the present embodiment, the first-type application is a single-instance application which can run in only one activated window at any moment. The first-type application is a multi-instance application which can run in multiple activated windows at the same time.

To be noted, description of electronic devices below is similar to that of the above methods. The beneficial effects are the same as those of the methods, and thus description thereof will be omitted. Details of the electronic device embodiments of the present disclosure can be learned with reference to the description of the method embodiments of the present disclosure.

Figure 26:
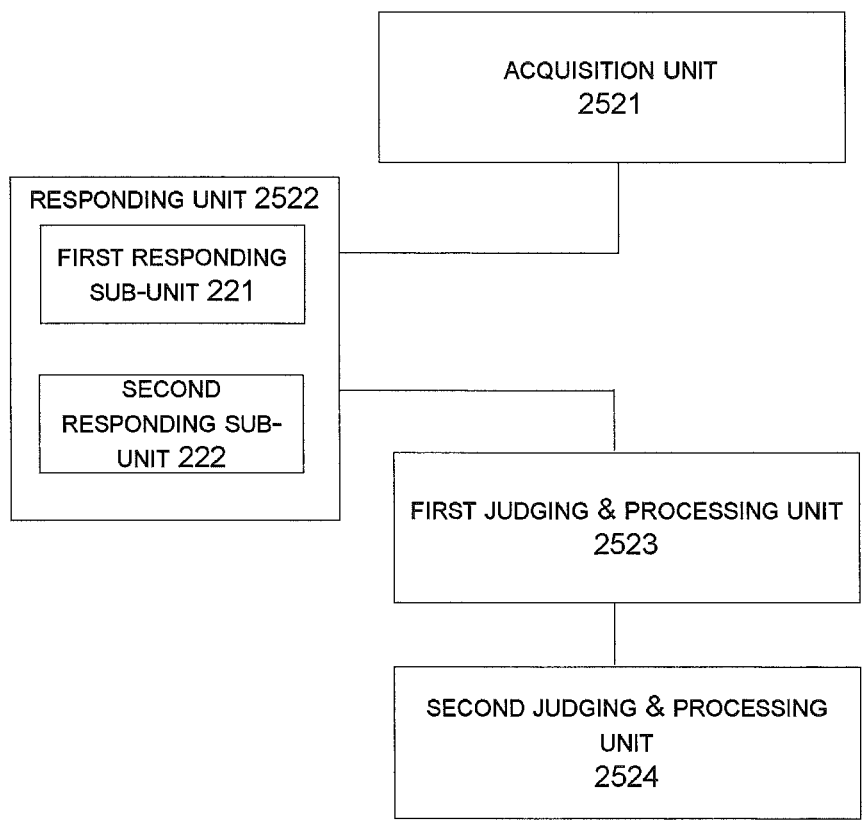
FIG. 26 is a schematic block diagram of an electronic device embodiment of the present disclosure.

An electronic device according to an embodiment of the present disclosure includes a display unit including a display region, and is capable of executing multiple applications and displaying the multiple applications in multiple windows at the same time. The multiple applications include first-type and second-type applications. The multiple windows include windowlets and/or fullscreen windows. The windowlet is smaller than the fullscreen window and is obtained by transforming the fullscreen window using a first parameter. As shown in FIG. 26, the electronic device further includes:

an acquisition unit 2521 configured to acquire a first operation for starting a first application in a windowlet mode; a responding unit 2522 configured to, in response to the first operation, judge whether the first application is a first-type or second-type application; a first judging & processing unit 2523 configured to, if the first application is determined as a first-type application, judge whether the first application has been running in the window to generate a judgment result, and if the judgment result is Yes, control the first application to run in the foreground, and display the first application in a windowlet mode on the display unit, and if the judgment result is No, start the first application so that the first application is displayed in a windowlet; a second judging & processing unit 2524 configured to, if the first application is determined as a second-type application, newly open a windowlet to execute and display the first application.

The responding unit 2522 further includes a first responding sub-unit 221 and a second responding sub-unit 222. The first responding sub-unit 221 is configured to acquire description information of the first application, and determine the first application as a first-type application if the description information of the first application is matched with a preset description of a first-type application. The second responding sub-unit 222 is configured to acquire description information of the first application, and determine the first application as a second-type application if the description information of the first application is matched with a preset description of a second-type application.

In the present embodiment, the first-type application is a single-instance application which can run in only one activated window at any moment. The first-type application is a multi-instance application which can run in multiple activated windows at the same time.

In the present embodiment, the first parameter may be at least one of a parameter value, a matrix, a group of parameters, or a set of parameters.

Description of advantages of the present embodiment will be given in particular scenarios.

For example, as to whether a first application is a single-instance application or a multi-instance application, it is specified in a file AndroidManifest.xml of the application. With this file, it is possible to judge whether the description information of the first application is matched with a preset description of a first-type application or a preset description of a second-type application, and thus the system can determine whether the first application is a single-instance application or a multi-instance application.

The first application as a single-instance application may be started in a multi-window mode as follows.

A scenario is that a user has started the first application, and then attempts to start the application again in a windowlet. In this scenario, the first application is shifted to the foreground, and transformed to be displayed in a windowlet mode. The transform may specifically include scaling and position adjustment.

Another scenario is that the user has not started the first application. In this scenario, the first application is directly started in a windowlet mode.

The first application as a multi-instance application may be started in a multi-window mode as follows.

A scenario is that the user chooses to start the first application in a windowlet mode. In this scenario, each time the user chooses to start the first application in a windowlet mode, an instance of the application is established, and the first application is displayed in a windowlet mode.

The present embodiment provides an information processing method and an electronic device having a touch-sensitive display unit. The electronic device is able to execute multiple applications and execute a multi-window manager. The multi-window manager displays at most N interactive objects corresponding to N application, respectively, N is a natural number. When any of the interactive objects is triggered in the multi-window manager to start an application corresponding to the interactive object, a first transform parameter is determined. A fullscreen window of the executed application is transformed using the first transform parameter so that the application is presented in a windowlet having a display area smaller than that of the fullscreen window.

In the embodiment of the present disclosure, the application installed in the electronic device may be an application built in the electronic device system, for example, a clock application, a calculator application, a camera application, and an address book application, or may be a third-party application installed by a user, for example, a game application, a WeChat application, a browser application, an instant chat application, a mail application, an organization application etc.

In general, all the installed applications can be displayed in a form of an interactive object on the desktop of the electronic device and corresponds to one interactive object. The interactive object may be an object logo, which is generally an icon. An application corresponding to an object logo of the application may be started by operating the object logo. For example, on the desktop of the electronic device such as a mobile phone, when a user touches an icon of the address book application, the address book application may be started, to enable the address book recorded in the address book application to be displayed on the display screen of the electronic device. When the application is started through the desktop, the application will be displayed in a form of fullscreen window on the display screen of the electronic device.

In the embodiment of the present disclosure, the first transform parameter may be pre-stored in a database of the electronic device, and may be at least one of a parameter value, a matrix, a group of parameters or a set of parameters. For example, in practical applications, the first transform parameter may be represented in a form of matrix, or in a form of a group of parameters. Each of the parameters in the group may be a numerical value, or a vector. In the following, the first transform parameter will be represented in a form of a matrix, and thus defined as a first matrix in the embodiment of the present disclosure. The first matrix may be pre-stored in a matrix function library of the electronic device. The fullscreen window of the application may be transformed into a windowlet using the first matrix. For example, transforms such as scale-down, translation and shape transform may be applied to the fullscreen window to convert the fullscreen window into a windowlet.

Graphical buffer data of the application in the fullscreen window may be transformed into graphical buffer data of the application in the windowlet using the first matrix. With the transform of the graphical buffer data in the fullscreen window, a display effect can be achieved that the fullscreen window of the application is scaled down to a windowlet, and thus the application is displayed in a windowlet state on the touch-sensitive display unit. Meanwhile, the first matrix may also be used to perform, for example, a translation transform, a shape transform, or an angle transform on the windowlet.

Preferably, the first matrix may be preset by a manufacturer of the electronic device, or may be set manually by a user on the electronic device. In order to facilitate the user in setting the first matrix manually, the electronic device provides a function of automatically generating a matrix. The user may simply set certain parameters related to the first matrix, for example, a window horizontal coordinate scale parameter, a window longitudinal coordinate scale parameter, a window translation parameter, a window shape parameter, and a window angle rotation parameter, and then the electronic device may generate a corresponding first matrix based on these parameters.

Figure 27:
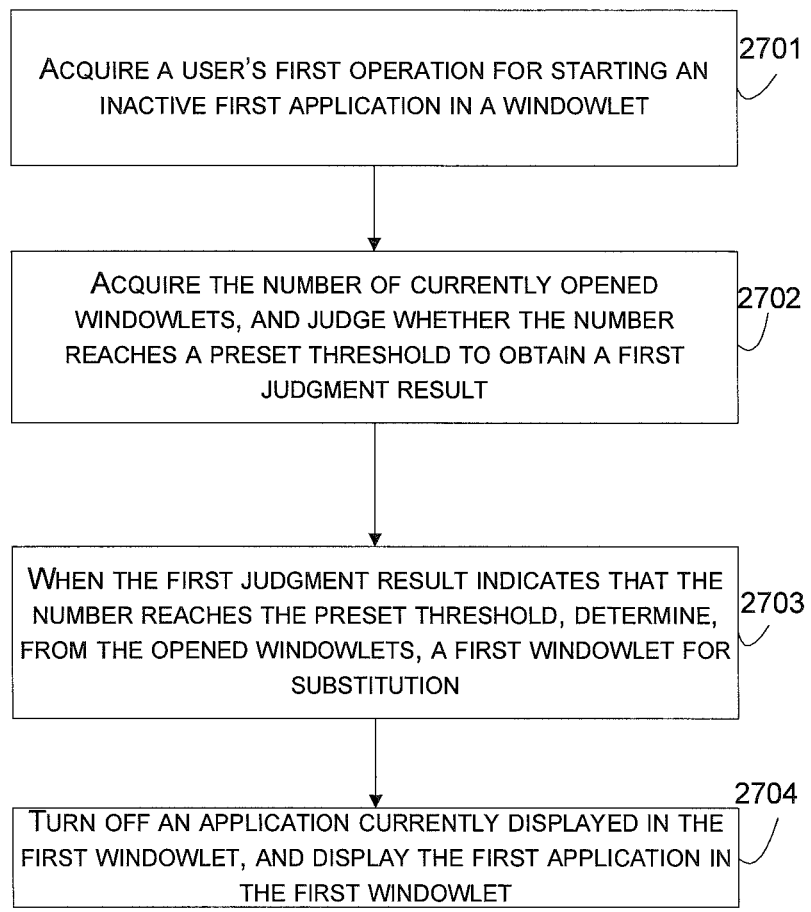
FIG. 27 is a schematic flowchart of an information processing method according to an embodiment of the present disclosure.

The present embodiment provides an information processing method applied in an electronic device. The electronic device is provided with a multi-window manager. The multi-window manager includes N interactive objects, N is a natural number. The N interactive objects include N−1 first object logos corresponding to N−1 applications, respectively. When any of the first interactive objects is triggered in the multi-window manager, a first transform parameter is determined. A fullscreen window of the executed application is transformed using the first transform parameter so that the application is presented in a windowlet having a display area smaller than that of the fullscreen window. FIG. 27 is a schematic flowchart of the information processing method according to the present embodiment. As shown in FIG. 27, the method includes: Step 2701: acquiring a user's first operation for starting an inactive first application in a windowlet; Step 2702: acquiring the number of currently opened windowlets, and judging whether the number reaches a preset threshold to obtain a first judgment result; Step 2703: when the first judgment result indicates that the number reaches the preset threshold, determining, from the opened windowlets, a first windowlet for substitution; Step 2704: turning off an application currently displayed in the first windowlet, and displaying the first application in the first windowlet.

Here, the step of acquiring the first operation may include step A1 and step A2.

Step A1: detecting whether a touch operation satisfying a first predetermined condition occurs.

Step A2: determining the acquisition of the first operation when the touch operation satisfying a first predetermined condition occurs.

The touch operation satisfying a first predetermined condition may be implemented as a single-click touch operation, a double-click touch operation, a three-finger touch operation or a five-finger touch operation.

Here, the step of acquiring the first operation may include step B1 and step B2.

Step B1: detecting whether a key operation satisfying a second predetermined condition occurs.

Step B2: determining the acquisition of the first operation when the key operation satisfying the second predetermined condition occurs.

The key operation satisfying a second predetermined condition may be implemented as pressing a key for a long time, such as pressing a functional key (HOME) for more than 2 seconds, or pressing a combination of keys, such as combination of keys HOME and BACK.

Here, the step of acquiring the first operation may include step C1 and step C2.

Step C1: detecting whether a posture change in the electronic device satisfying a third predetermined condition occurs.

Step C2: determining the acquisition of first, second or third event when a posture change in the electronic device satisfying the third predetermined condition occurs.

The present embodiment first acquires a user's first operation, and then acquires the number of currently opened windowlets, and judges whether the number reaches a preset threshold to obtain a first judgment result; when the first judgment result indicates that the number reaches the preset threshold, determines a first windowlet, and displays the first application in the first windowlet. In this way, it is possible to freely substitute an old window with a newly opened window when the number of displayed windows reaches an upper limit. This can improve user experience.

Figure 28:
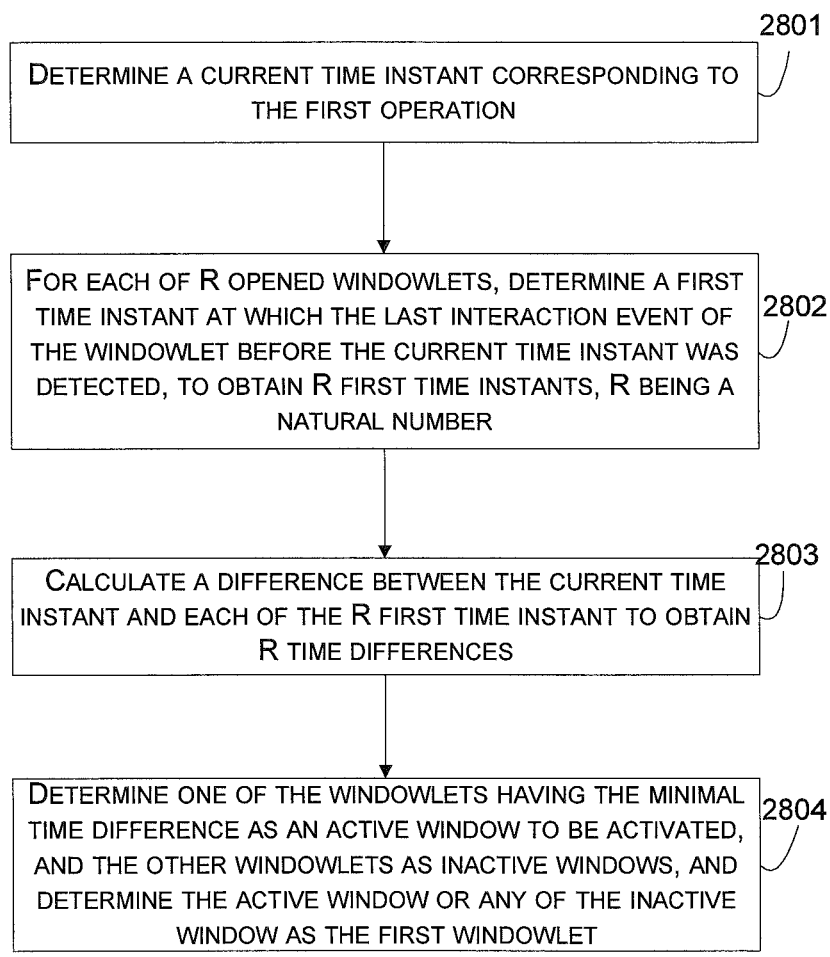
FIG. 28 is a schematic flowchart of an implementation of step 2703 according to an embodiment of the present disclosure.

FIG. 28 is a schematic flowchart of the implementation of step 2703 according to the present embodiment. As shown in FIG. 28, step 2703 may further includes: Step 2801: determining a current time instant corresponding to the first operation; Step 2802: for each of R opened windowlets, determining a first time instant at which the last interaction event of the windowlet before the current time instant was detected, to obtain R first time instants, R being a natural number; Step 2803: calculating a difference between the current time instant and each of the R first time instant to obtain R time differences; Step 2804: determining one of the windowlets having the minimal time difference as an active window to be activated, and the other windowlets as inactive windows, and determining the active window or any of the inactive window as the first windowlet.

In practical implementations, a default substitution method may have been set when the electronic device is prepared for shipping. For example, the default window for substitution may be an active window. The user may set the substitution method when he or she uses the electronic device. For example, the user may change the default substitution method with an active window to a substitution method with an inactive window. In the present embodiment, the substitution may be freely performed by using the active or inactive window as a window to displaying a newly-started application.

Figure 29:
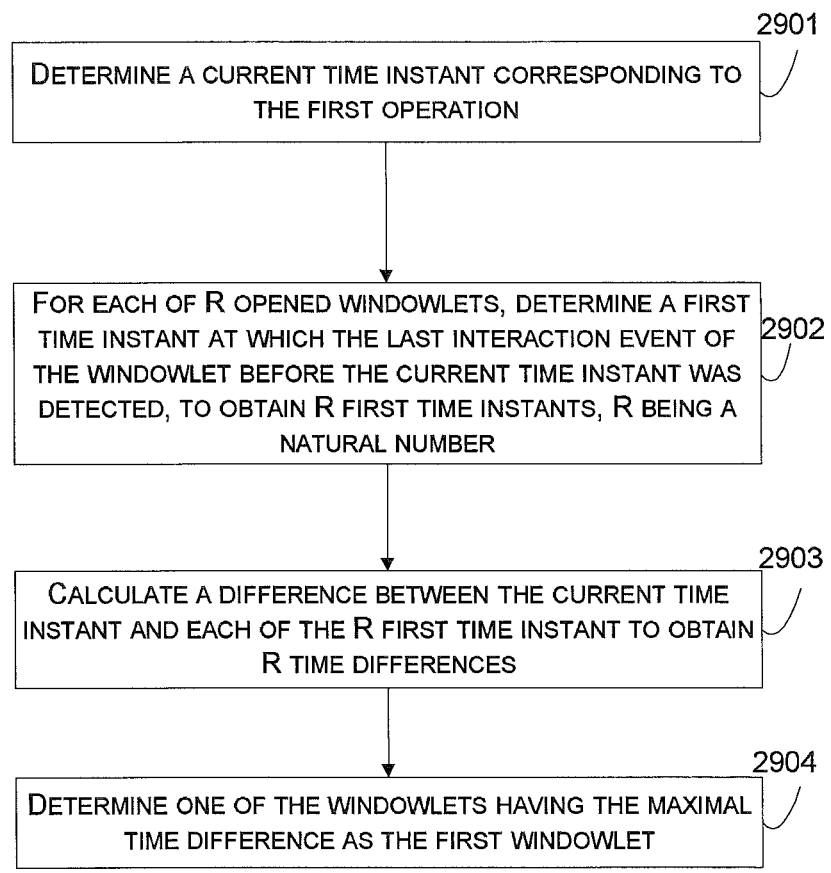
FIG. 29 is a schematic flowchart of an implementation of step 2703 according to an embodiment of the present disclosure.

An embodiment of the present disclosure provides an information processing method based on the above solution of the embodiment. FIG. 29 is a schematic flowchart of the implementation of step 2703 according to the present embodiment. As shown in FIG. 29, step 2703 may further includes: Step 2901: determining a current time instant corresponding to the first operation; Step 2902: for each of R opened windowlets, determining a first time instant at which the last interaction event of the windowlet before the current time instant was detected, to obtain R first time instants, R being a natural number; Step 2903: calculating a difference between the current time instant and each of the R first time instant to obtain R time differences; Step 2904: determining one of the windowlets having the maximal time difference as the first windowlet.

In the present embodiment, the windowlet having the maximal time difference is generally a window that is not currently used. By determining the windowlet having the maximal time difference as the first windowlet, the substitution method is more appropriate.

Figure 30:
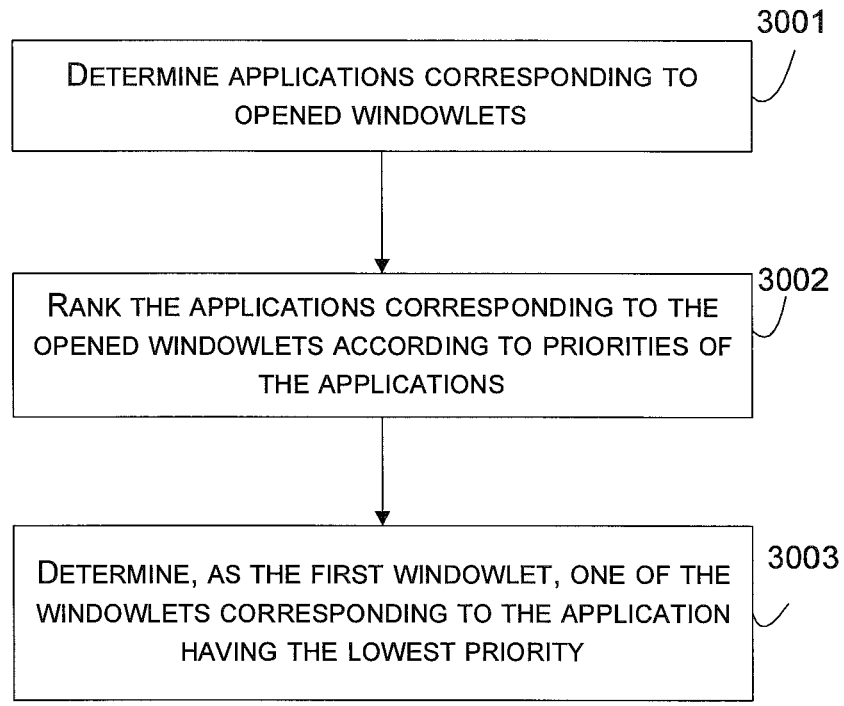
FIG. 30 is a schematic flowchart of an implementation of step 2703 according to an embodiment of the present disclosure.

In the present embodiment, priority may be defined for applications in advance. FIG. 20 is a schematic flowchart of the implementation of step 2703 according to the present embodiment. As shown in FIG. 30, step 2703 may further includes: Step 3001: determining applications corresponding to opened windowlets; Step 3002: ranking the applications corresponding to the opened windowlets according to priorities of the applications; Step 3003: determining, as the first windowlet, one of the windowlets corresponding to the application having the lowest priority.

Here, the priorities of the applications may be set by default when the electronic device is prepared for shipping, or may be set by the user. The priority may be set for each application or according to types of applications. For example, the priority of a video-type application is higher than that of an address-book-type application. As such, when a new application is started in a windowlet, the first windowlet may be the windowlet displaying the address-book-type application. In the present embodiment, the substitution of applications in windowlets can be performed conveniently according to the priorities of the applications.

Figure 31:
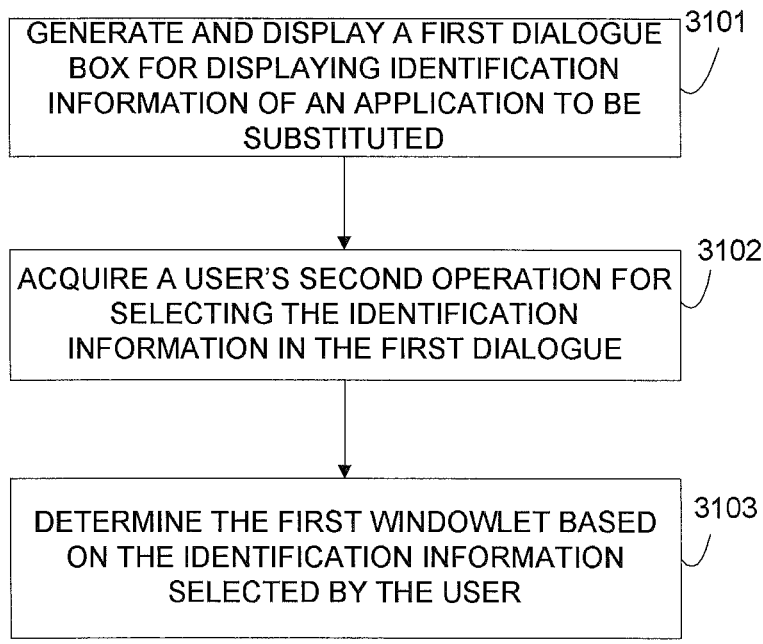
FIG. 31 is a schematic flowchart of an implementation of step 2703 according to an embodiment of the present disclosure.

An embodiment of the present disclosure provides an information processing method based on the above solution of the embodiment. FIG. 31 is a schematic flowchart of the implementation of step 2703 according to the present embodiment. As shown in FIG. 31, step 2703 may further includes: Step 3101: generating and displaying a first dialogue box for displaying identification information of an application to be substituted; Step 3102: acquiring a user's second operation for selecting the identification information in the first dialogue; Step 3103: determining the first windowlet based on the identification information selected by the user.

Here, the identification information in the first dialogue may be a name of an application. In an example, the electronic device of the user can display at most 2 applications in the windowlet mode. The user newly started an application G, where G is the name of the newly-started application. Before that, the user has started 2 (the maximal number) applications G1 and G2, where G1 and G2 are the names of the two applications. In this case, the first dialogue may display: please select an application to be substituted, G1 and G2. There may be selection logos at the positions of G1 and G2 for acquiring the user's second operation. If the user selects G2, the windowlet displaying the application G2 is the first windowlet.

The present embodiment acquires the user's second operation, and determines the first windowlet based on the second operation. Thus, the solution of the present embodiment is more user-friendly and improves use experience.

Figure 32:
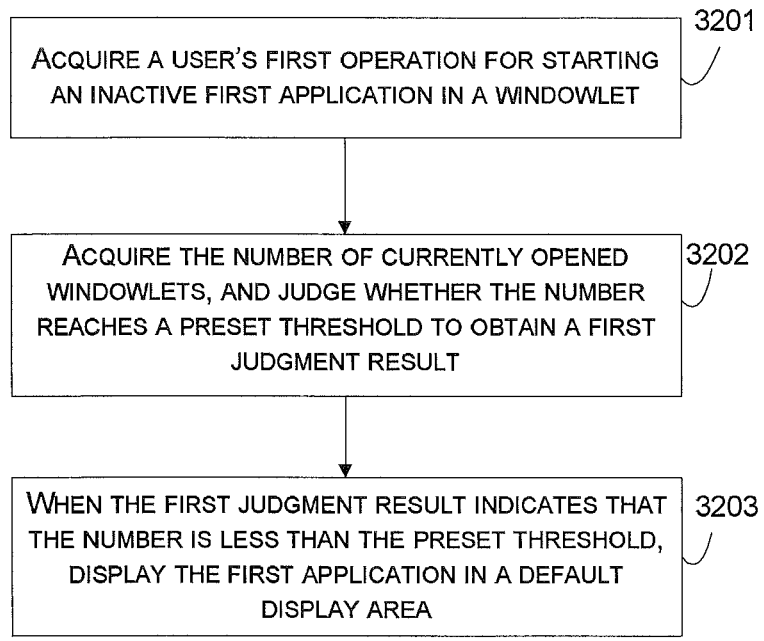
FIG. 32 is a schematic flowchart of an information processing method according to an embodiment of the present disclosure.

An embodiment of the present disclosure provides an information processing method applied in an electronic device. The electronic device is provided with a multi-window manager. The multi-window manager includes N interactive objects, N is a natural number. The N interactive objects include N−1 first object logos corresponding to N−1 applications, respectively. When any of the first interactive objects is triggered in the multi-window manager, a first transform parameter is determined. A fullscreen window of the executed application is transformed using the first transform parameter so that the application is presented in a windowlet having a display area smaller than that of the fullscreen window. FIG. 32 is a schematic flowchart of the information processing method according to the present embodiment. As shown in FIG. 32, the method includes: Step 3201: acquiring a user's first operation for starting an inactive first application in a windowlet; Step 3202: acquiring the number of currently opened windowlets, and judging whether the number reaches a preset threshold to obtain a first judgment result; Step 3203: when the first judgment result indicates that the number is less than the preset threshold, displaying the first application in a default display area.

Figure 33:
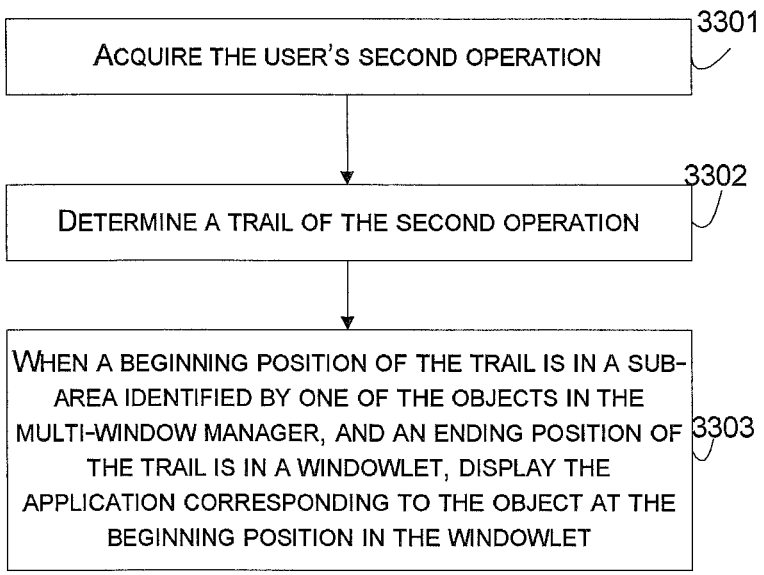
FIG. 33 is a schematic flowchart of an information processing method according to an embodiment of the present disclosure.

An embodiment of the present disclosure provides an information processing method applied in an electronic device. The electronic device is provided with a multi-window manager. The multi-window manager includes N interactive objects, N is a natural number. The N interactive objects include N−1 first object logos corresponding to N−1 applications, respectively. When any of the first interactive objects is triggered in the multi-window manager, a first transform parameter is determined. A fullscreen window of the executed application is transformed using the first transform parameter so that the application is presented in a windowlet having a display area smaller than that of the fullscreen window. FIG. 33 is a schematic flowchart of the information processing method according to the present embodiment. As shown in FIG. 33, the method includes: Step 3301: acquiring the user's second operation; Step 3302: determining a trail of the second operation; Step 3303: when a beginning position of the trail is in a sub-area identified by one of the objects in the multi-window manager, and an ending position of the trail is in a windowlet, displaying the application corresponding to the object at the beginning position in the windowlet.

The present embodiment provides a substitution method by a drag operation, that is, determining the trail of the user's second operation, and determining whether an object logo in the multi-window manager is to be dragged to a windowlet based on the beginning and ending positions of the trail. If it is to be dragged, the application corresponding to the dragged object logo will be displayed in a windowlet selected by the user. The solution of the present embodiment further facilitates the user to display a newly-started application in a windowlet.

Figure 34:
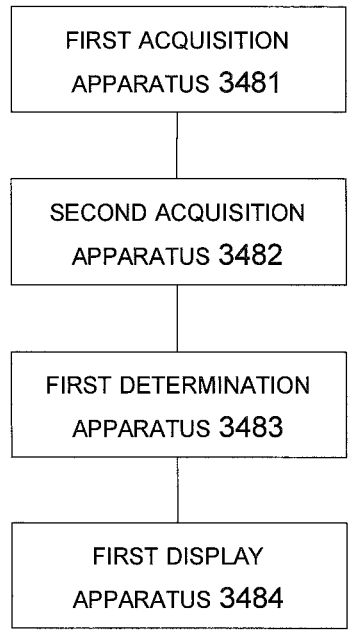
FIG. 34 is a schematic block diagram of an electronic device according to an embodiment of the present disclosure.

An embodiment of the present disclosure provides an electronic device which is provided with a multi-window manager. The multi-window manager includes N interactive objects, N is a natural number. The N interactive objects include N−1 first object logos corresponding to N−1 applications, respectively. When any of the first interactive objects is triggered in the multi-window manager, a first transform parameter is determined. A fullscreen window of the executed application is transformed using the first transform parameter so that the application is presented in a windowlet having a display area smaller than that of the fullscreen window. FIG. 34 is a schematic block diagram of the electronic device according to the present embodiment. As shown in FIG. 34, the electronic device includes a first acquisition apparatus 3481, a second acquisition apparatus 3482, a first determination apparatus 3483, and a first display apparatus 3484.

The first acquisition apparatus 3481 is configured to acquire a user's first operation for starting an inactive first application in a windowlet.

The second acquisition apparatus 3482 is configured to acquire the number of currently opened windowlets, and judge whether the number reaches a preset threshold to obtain a first judgment result.

The first determination apparatus 3483 is configured to, when the first judgment result indicates that the number reaches the preset threshold, determine, from the opened windowlets, a first windowlet for substitution.

The first display apparatus 3484 is configured to turn off an application currently displayed in the first windowlet, and display the first application in the first windowlet.

In an embodiment, the first display apparatus 3484 is further configured to display the first application in a default display area when the first judgment result indicates that the number is less than the preset threshold.

Here, the first acquisition apparatus 3481 may include a detection unit D1 and a determination unit D2.

The detection unit D1 is configured to detect whether a touch operation satisfying a first predetermined condition occurs.

The determination unit D2 is configured to determine the acquisition of the first operation when the touch operation satisfying a first predetermined condition occurs.

The touch operation satisfying a first predetermined condition may be implemented as a single-click touch operation, a double-click touch operation, a three-finger touch operation or a five-finger touch operation.

Here, the first acquisition apparatus 3481 may include a detection unit E1 and a determination unit E2.

The detection unit E1 is configured to detect whether a key operation satisfying a second predetermined condition occurs;

The determination unit E2 is configured to determine the acquisition of the first operation when the key operation satisfying the second predetermined condition occurs.

The key operation satisfying a second predetermined condition may be implemented as pressing a key for a long time, such as pressing a functional key (HOME) for more than 2 seconds, or pressing a combination of keys, such as combination of keys HOME and BACK.

Here, the first acquisition apparatus 3481 may include a detection unit F1 and a determination unit F2.

The detection unit F1 is configured to detect whether a posture change in the electronic device satisfying a third predetermined condition occurs;

The determination unit F2 is configured to determine the acquisition of first, second or third event when a posture change in the electronic device satisfying the third predetermined condition occurs.

Here, the posture change may be a change in the position of the electronic device. The first operation may be a sound-controlled operation. In the present embodiment, the first operation may be any of various operations on interactive objects in the multi-window manager. Details thereof will be omitted.

The present embodiment first acquires a user's first operation, and then acquires the number of currently opened windowlets, and judges whether the number reaches a preset threshold to obtain a first judgment result; when the first judgment result indicates that the number reaches the preset threshold, determines a first windowlet, and displays the first application in the first windowlet. In this way, it is possible to freely substitute an old window with a newly opened window when the number of displayed windows reaches an upper limit. This can improve user experience.

Figure 35:
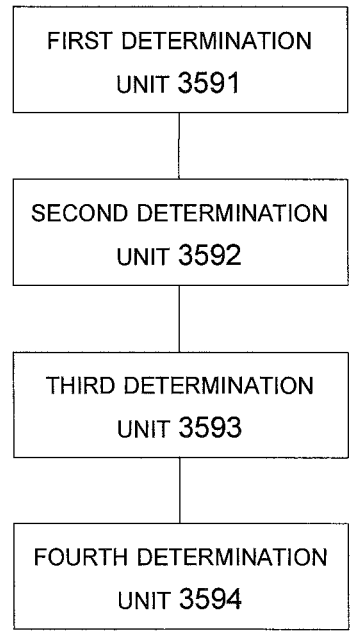
FIG. 35 is a schematic block diagram of a first determination apparatus according to an embodiment of the present disclosure.

FIG. 35 is a schematic block diagram of the first determination apparatus according to the present embodiment. As shown in FIG. 35, the first determination apparatus may further includes a first determination unit 3591, a second determination unit 3592, a third determination unit 3593, and a fourth determination unit 3594.

The first determination unit 3591 is configured to determine a current time instant corresponding to the first operation, when the first judgment result indicates that the number reaches the preset threshold.

The second determination unit 3592 is configured to, for each of R opened windowlets, determine a first time instant at which the last interaction event of the windowlet before the current time instant was detected, to obtain R first time instants, R being a natural number.

The third determination unit 3593 is configured to calculate a difference between the current time instant and each of the R first time instant to obtain R time differences.

The fourth determination unit 3594 is configured to determine one of the windowlets having the minimal time difference as an active window to be activated, and the other windowlets as inactive windows, and determine the active window or any of the inactive windows as the first windowlet.

In practical implementations, a default substitution method may have been set when the electronic device is prepared for shipping. For example, the default window for substitution may be an active window. The user may set the substitution method when he or she uses the electronic device. For example, the user may change the default substitution method with an active window to a substitution method with an inactive window. In the present embodiment, the substitution may be freely performed by using the active or inactive window as a window to displaying a newly-started application.

Figure 36:
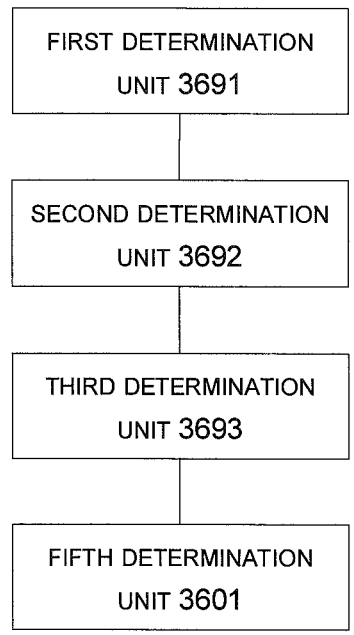
FIG. 36 is a schematic block diagram of a first determination apparatus according to an embodiment of the present disclosure.

FIG. 36 is a schematic block diagram of the first determination apparatus according to the present embodiment. As shown in FIG. 36, the first determination apparatus may further include a first determination unit 3691, a second determination unit 3692, a third determination unit 3693, and a fifth determination unit 3601.

The first determination unit 3691 is configured to determine a current time instant corresponding to the first operation, when the first judgment result indicates that the number reaches the preset threshold.

The second determination unit 3692 is configured to, for each of R opened windowlets, determine a first time instant at which the last interaction event of the windowlet before the current time instant was detected, to obtain R first time instants, R being a natural number.

The third determination unit 3693 is configured to calculate a difference between the current time instant and each of the R first time instant to obtain R time differences.

The fifth determination unit 3601 is configured to determine one of the windowlets having the maximal time difference as the first windowlet.

In the present embodiment, the windowlet having the maximal time difference is generally a window that is not currently used. By determining the windowlet having the maximal time difference as the first windowlet, the substitution method is more appropriate.

Figure 37:
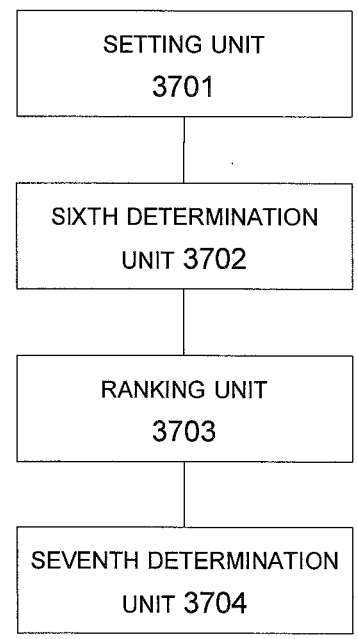
FIG. 37 is a schematic block diagram of a first determination apparatus according to an embodiment of the present disclosure.

FIG. 37 is a schematic block diagram of the first determination apparatus according to the present embodiment. As shown in FIG. 37, the first determination apparatus may further include a setting unit 3701, a sixth determination unit 3702, a ranking unit 3703, and a seventh determination unit 3704.

The setting unit 3701 is configured to set priorities for N application.

The sixth determination unit 3702 is configured to determine applications corresponding to opened windowlets.

The ranking unit 3703 is configured to rank the applications corresponding to the opened windowlets according to priorities of the applications.

The seventh determination unit 3704 is configured to determine, as the first windowlet, one of the windowlets corresponding to the application having the lowest priority.

Here, the priorities of the applications may be set by default when the electronic device is prepared for shipping, or may be set by the user. The priority may be set for each application or according to types of applications. For example, the priority of a video-type application is higher than that of an address-book-type application. As such, when a new application is started in a windowlet, the first windowlet may be the windowlet displaying the address-book-type application. In the present embodiment, the substitution of applications in windowlets can be performed conveniently according to the priorities of the applications.

Figure 38:
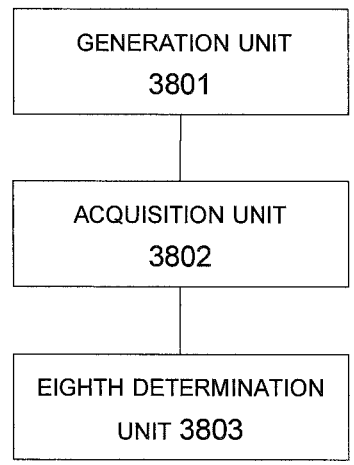
FIG. 38 is a schematic block diagram of a first determination apparatus according to an embodiment of the present disclosure.

FIG. 38 is a schematic block diagram of the first determination apparatus according to the present embodiment. As shown in FIG. 38, the first determination apparatus may further include a generation unit 3801, an acquisition unit 3802, and an eighth determination unit 3803.

The generation unit 3801 is configured to generate and display a first dialogue box for displaying identification information of an application to be substituted.

The acquisition unit 3802 is configured to acquire a user's second operation for selecting the identification information in the first dialogue.

The eighth determination unit 3803 is configured to determine the first windowlet based on the identification information selected by the user.

Here, the identification information in the first dialogue may be a name of an application. In an example, the electronic device of the user can display at most 2 applications in the windowlet mode. The user newly started an application G, where G is the name of the newly-started application. Before that, the user has started 2 (the maximal number) applications G1 and G2, where G1 and G2 are the names of the two applications. In this case, the first dialogue may display: please select an application to be substituted, G1 and G2. There may be selection logos at the positions of G1 and G2 for acquiring the user's second operation. If the user selects G2, the windowlet displaying the application G2 is the first windowlet.

The present embodiment acquires the user's second operation, and determines the first windowlet based on the second operation. Thus, the solution of the present embodiment is more user-friendly and improves use experience.

Figure 39:
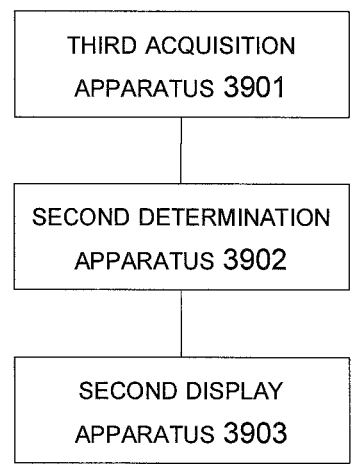
FIG. 39 is a schematic block diagram of an electronic device according to an embodiment of the present disclosure.

An embodiment of the present disclosure provides an electronic device. The electronic device is provided with a multi-window manager. The multi-window manager includes N interactive objects, N is a natural number. The N interactive objects include N−1 first object logos corresponding to N−1 applications, respectively. When any of the first interactive objects is triggered in the multi-window manager, a first transform parameter is determined. A fullscreen window of the executed application is transformed using the first transform parameter so that the application is presented in a windowlet having a display area smaller than that of the fullscreen window. FIG. 39 is a schematic block diagram of the electronic device according to the present embodiment. As shown in FIG. 39, the electronic device may include a third acquisition apparatus 3901, a second determination apparatus 3902, and a second display apparatus 3903.

The third acquisition apparatus 3901 is configured to acquire the user's second operation.

The second determination apparatus 3902 is configured to determining a trail of the second operation.

The second display apparatus 3903 is configured to, when the beginning position of the trail is in a sub-area of one of the object logos of the multi-window manager, and the ending position of the trail is in a windowlet, display the application corresponding to the object logo at the beginning position in the windowlet.

The present embodiment provides a substitution method by a drag operation, that is, determining the trail of the user's second operation, and determining whether an object logo in the multi-window manager is to be dragged to a windowlet based on the beginning and ending positions of the trail. If it is to be dragged, the application corresponding to the dragged object logo will be displayed in a windowlet selected by the user. The solution of the present embodiment further facilitates the user to display a newly-started application in a windowlet Here, the first acquisition apparatus 3481 may include a detection unit D1 and a determination unit D2.

The detection unit D1 is configured to detect whether a touch operation satisfying a first predetermined condition occurs.

The determination unit D2 is configured to determine the acquisition of the first operation when the touch operation satisfying a first predetermined condition occurs.

The touch operation satisfying a first predetermined condition may be implemented as a single-click touch operation, a double-click touch operation, a three-finger touch operation or a five-finger touch operation.

Here, the first acquisition apparatus 3481 may include a detection unit E1 and a determination unit E2.

The detection unit E1 is configured to detect whether a key operation satisfying a second predetermined condition occurs;

The determination unit E2 is configured to determine the acquisition of the first operation when the key operation satisfying the second predetermined condition occurs.

The key operation satisfying a second predetermined condition may be implemented as pressing a key for a long time, such as pressing a functional key (HOME) for more than 2 seconds, or pressing a combination of keys, such as combination of keys HOME and BACK.

Here, the first acquisition apparatus 3481 may include a detection unit F1 and a determination unit F2.

The detection unit F1 is configured to detect whether a posture change in the electronic device satisfying a third predetermined condition occurs;

The determination unit F2 is configured to determine the acquisition of first, second or third event when a posture change in the electronic device satisfying the third predetermined condition occurs.

Here, the posture change may be a change in the position of the electronic device. The first operation may be a sound-controlled operation. In the present embodiment, the first operation may be any of various operations on interactive objects in the multi-window manager. Details thereof will be omitted.

The present embodiment provides a substitution method by a drag operation, that is, determining the trail of the user's second operation, and determining whether an object logo in the multi-window manager is to be dragged to a windowlet based on the beginning and ending positions of the trail. If it is to be dragged, the application corresponding to the dragged object logo will be displayed in a windowlet selected by the user. The solution of the present embodiment further facilitates the user to display a newly-started application in a windowlet.

It should be understood that in the embodiments of the present application, the disclosed devices and methods can be implemented in other manners. The device embodiments described above are only illustrative. For example, the division of the units is merely a logical functional division, and in practical applications, there may be other division manners, for example, multiple units or components may be combined or integrated into another system, or some features may be omitted or not performed. In addition, the coupling, direct coupling, or communication connection between various constituent parts displayed or discussed may be implemented by some interfaces, and indirect coupling or communication connections between devices or units may be electrical, mechanical or in another form.

The above units which are described as separate components may be or may not be physically separate, and the components displayed as units may be or may not be physical units, i.e., they may be located in one place, or may also be distributed across multiple network units. A part or all of the units can be selected according to actual needs to implement the purpose of the solutions of the present embodiments.

In addition, various functional units according to various embodiments of the present disclosure may all be integrated into one processing unit, or individual units may also be used as one unit respectively, or two or more units may be integrated into one processing unit. The above integrated units may be implemented in a form of hardware, or may also be implemented in a form of hardware and software functional units.

The ordinary skilled in the art can understand that all or a part of the steps for implementing the above method embodiments can be implemented by hardware related to program instructions. The above programs can be stored in a computer readable storage medium, and when the programs are performed, the steps of the above method embodiments are performed. The above storage medium includes various media which can store program codes, such as a mobile storage device, a Read-Only Memory (ROM), a Random Access Memory (RAM), a disk or a disc.

Alternatively, if the integrated units of the present disclosure described above are implemented in a form of software functional means and are sold or used as independent products, they can also be stored in a computer readable storage medium. Based on such understanding, the solutions of the embodiments of the present disclosure substantially or the parts contributing to the conventional technology can be embodied in a form of software product. The computer software product is stored in a storage medium, and includes a number of instructions for enabling a computer device (such as a personal computer, a server or a network device etc.) to perform all or a part of the methods according to various embodiments of the present disclosure. The storage medium described above includes various media which can store program codes, such as a mobile storage device, a Read-Only Memory (ROM), a Random Access Memory (RAM), a disk or a disc.

The above description is merely specific embodiments of the present disclosure. However, the protection scope of the present disclosure is not limited thereto. Those skilled in the art can easily appreciate that all variations or substitutions made within the scope disclosed in the present disclosure fall into the protection scope of the present disclosure. Therefore, the protection scope of the present disclosure should be limited by the protection scope of the claims.

What is claimed is:

1. An information processing method in an electronic device, wherein the electronic device comprises a touch-sensitive display unit having a display region, the method comprising:
   receiving a first operation by a user;
   starting a first application and displaying the first application in a first window in response to the first operation;
   receiving a second operation by the user in the first window; and
   parsing the second operation, determining an object corresponding to the second operation, determining a second application corresponding to the object, and starting the second application in a windowlet if the first window is a windowlet, or starting the second in a fullscreen window if the first window is a fullscreen window, wherein the windowlet is obtained by transforming the fullscreen window using a first parameter, and the first parameter at least comprises one of a parameter value, a matrix, a group of parameters, or a set of parameters.

2. The method of claim 1, wherein said starting a first application and displaying the first application in a first window in response to the first operation further comprises:
   upon starting the first application in response to the first operation, acquiring the first parameter, and transforming the first window of the first application using the first parameter, wherein the first window comprises a fullscreen window;
   determining a second window of the first application having a display area smaller than that of the fullscreen window of the first application; and
   presenting the second window of the first application in the display region of the electronic device, wherein the second window comprises a windowlet transformed from the first window.

3. The method of claim 1, further comprising: judging whether the second application meets a predetermined condition to obtain a judgment result; and starting the second application in a windowlet if the judgment result shows that the second application meets the predetermined condition.

4. The method of claim 1, wherein said judging whether the second application meets a predetermined condition to obtain a judgment result and starting the second application in a windowlet if the judgment result shows that the second application meets the predetermined condition comprises:
   acquiring a first attribute parameter of the first application;
   acquiring a second attribute parameter of the second application;
   judging whether the first and second attribute parameters match, if so, determining the second application meets the predetermined condition, and starting the second application in a windowlet.

5. An electronic device, wherein the electronic device comprises a touch-sensitive display unit having a display region, the electronic device further comprising:
   a first receiving unit configured to receive a first operation by a user;
   a first responding unit configured to start a first application and display the first application in a first window in response to the first operation;
   a second receiving unit configured to receive a second operation by the user in the first window; and
   a first processing unit configured to parse the second operation, determine an object corresponding to the second operation, determine a second application corresponding to the object, and start the second application in a windowlet if the first window is a windowlet, or start the second in a fullscreen window if the first window is a fullscreen window, wherein the windowlet is obtained by transforming the fullscreen window using a first parameter, and the first parameter at least comprises one of a parameter value, a matrix, a group of parameters, or a set of parameters.

6. The electronic device of claim 5, wherein the first responding unit is further configured to, upon starting the first application in response to the first operation, acquire the first parameter, and transform the first window of the first application using the first parameter, wherein the first window comprises a fullscreen window; determine a second window of the first application having a display area smaller than that of the fullscreen window of the first application; and present the second window of the first application in the display region of the electronic device, wherein the second window comprises a windowlet transformed from the first window.

7. The electronic device of claim 5, wherein the first processing unit is further configured to judge whether the second application meets a predetermined condition to obtain a judgment result, and start the second application in a windowlet if the judgment result shows that the second application meets the predetermined condition.

8. The electronic device of claim 7, wherein the first processing unit is further configured to acquire a first attribute parameter of the first application; acquire a second attribute parameter of the second application; judge whether the first and second attribute parameters match, if so, determine the second application meets the predetermined condition, and start the second application in a windowlet.

9. An information processing method in an electronic device, wherein the electronic device is able to execute a first application, the method comprising:
receiving a first operation by a user;
starting the first application in response to the first operation;
transforming a fullscreen window of the first application into a windowlet to display the first application, wherein the windowlet of the first application has a display area smaller than that of the fullscreen window, and is obtained by transforming the fullscreen window using a first transform parameter, and wherein the first transform parameter at least comprises one of a parameter value, a matrix, a group of parameters, or a set of parameters.

10. The method of claim 9, further comprising:
upon detection of a second operation, generating an adjustment instruction for adjusting the window in which the first application is displayed based on the second operation;
obtaining the adjusted window to display the first application, and recording state information of the adjusted window;
retrieving the state information of the adjusted window upon detection of the second operation for starting the first application; and
displaying the first application based on the state information of the adjusted window.

11. The method of claim 10, wherein the second operation comprises a user's operation on size and/or display area of the window for displaying the first application while he or she uses the first application;
wherein the second operation at least comprises one of changing a display area of the window, scaling down the window, or scaling up the window;

wherein the state information of the adjusted window comprising information indicating that the first application is displayed in a fullscreen window or a windowlet;
wherein when the state information comprises information indicating that the first application is displayed in a windowlet, the state information further comprises one of size, display area or frame aspect ratio of the window.

12. The method of claim 10, wherein said displaying the first application based on the state information of the adjusted window further comprises:
calculating, within a preset time period, a number of times by which the first application has been displayed with the state information of the adjusted window, and displaying the first application based on the state information of the adjusted window if the number of times is equal to or greater than a preset threshold;
wherein the state information comprises position parameter information, size parameter information, and display parameter information.

13. The method of claim 12, further comprising:
judging, based on the position parameter information, whether a windowlet for an application is displayed at a corresponding position on the display unit to obtain a first judgment result; and determining position parameter information of a blank display area in the display unit, when the first judgment result indicates that a windowlet for an application is displayed at the position corresponding to the position parameter information; and
generating a windowlet corresponding to the size parameter information based on the size parameter information and the position parameter information of the blank display area, so that the windowlet for the first application is displayed in the blank display area.

14. The method of claim 9, wherein the electronic device is capable of executing multiple applications and displaying the multiple applications in multiple windows at the same time, the multiple applications comprise first-type and second-type applications, the multiple windows comprise windowlets and/or fullscreen windows, the windowlet has a display area smaller than that of the fullscreen window, and is obtained by transforming the fullscreen window using a first parameter, the method further comprises:
determining whether the first application is a first-type or second-type application, in response to the first operation;
if the first application is determined as a first-type application, determining whether the first application has been running in a window to generate a determination result;
if the determination result indicates that the first application has been running in a window, controlling the first application to run in foreground, and displaying the first application in a windowlet on the display unit;
if the determination result indicates that the first application has not been running in a window, starting the first application so that the first application is displayed in a windowlet;
newly opening a windowlet to execute and display the first application if the first application is determined as a second-type application.

15. The method of claim 14, wherein the first-type application can run in only one active window at any moment;
the second-type application can simultaneously run in multiple active windows.

16. The method of claim 14, wherein said determining whether the first application is a first-type or second-type application comprises:

acquiring description information of the first application;

determining the first application as a first-type application if the description information of the first application is matched with the preset description of a first-type application; and determining the first application as a second-type application if the description information of the first application is matched with the preset description of a second-type application.

17. The method of claim 9, wherein the electronic device is able to execute multiple applications and execute a multi-window manager, the multi-window manager displays at most N interactive objects corresponding to N application, respectively, N is a natural number;

when any of the interactive objects is triggered in the multi-window manager to start an application corresponding to the interactive object, a first transform parameter is determined;

a fullscreen window of the executed application is transformed using the first transform parameter so that the application is presented in a windowlet having a display area smaller than that of the fullscreen window;

the method comprises:

acquiring the user's first operation for starting an inactive first application in a windowlet;

acquiring the number of currently opened windowlets, and judging whether the number reaches a preset threshold to obtain a first judgment result;

when the first judgment result indicates that the number reaches the preset threshold, determining, from the opened windowlets, a first windowlet for substitution;

turning off an application currently displayed in the first windowlet, and displaying the first application in the first windowlet.

18. The method of claim 17, wherein said determining the first windowlet from the opened windowlets comprises:

determining a current time instant corresponding to the first operation;

for each of R opened windowlets, determining a first time instant at which the last interaction event of the windowlet before the current time instant was detected, to obtain R first time instants, R being a natural number;

calculating a difference between the current time instant and each of the R first time instant to obtain R time differences;

determining one of the windowlets having the minimal time difference as an active window to be activated, and the other windowlets as inactive windows, and determining the active window or any of the inactive window as the first windowlet.

19. The method of claim 17, wherein said determining the first windowlet from the opened windowlets comprises:

determining a current time instant corresponding to the first operation;

for each of R opened windowlets, determining a first time instant at which the last interaction event of the windowlet before the current time instant was detected, to obtain R first time instants, R being a natural number;

calculating a difference between the current time instant and each of the R first time instant to obtain R time differences;

determining one of the windowlets having the maximal time difference as the first windowlet.

20. The method of claim 17, wherein a priority is set for each of the N applications, and said determining the first windowlet from the opened windowlets comprises:

determining the applications corresponding to the opened windowlets;

ranking the applications corresponding to the opened windowlets according to the priorities of the applications;

determining, as the first windowlet, one of the windowlets corresponding to the application having the lowest priority.

21. The method of claim 17, wherein said determining the first windowlet from the opened windowlets comprises:

generating and displaying a first dialogue box for displaying identification information of an application to be substituted;

acquiring the user's second operation for selecting the identification information in the first dialogue; and determining the first windowlet based on the identification information selected by the user.

22. The method of claim 9, wherein the electronic device is provided with a multi-window manager, the multi-window manager comprises N interactive objects corresponding to N application, respectively, N is a natural number;

when any of the interactive objects is triggered in the multi-window manager to start an application corresponding to the interactive object, a first transform parameter is determined;

a fullscreen window of the executed application is transformed using the first transform parameter so that the application is presented in a windowlet having a display area smaller than that of the fullscreen window;

the method comprises:

acquiring the user's second operation;

determining a trail of the second operation;

when a beginning position of the trail is in a sub-area identified by one of the objects in the multi-window manager, and an ending position of the trail is in a windowlet, displaying the application corresponding to the object at the beginning position in the windowlet.

* * * * *